United States Patent [19]

Kishiro et al.

[11] Patent Number: 5,340,911
[45] Date of Patent: Aug. 23, 1994

[54] LIQUID CRYSTALLINE POLYESTERS AND METHODS FOR THEIR PRODUCTION

[75] Inventors: Osamu Kishiro, Atsugi; Rie Shirahama, Sagamihara; Yasuyuki Sakata, Machida; Hideaki Tanaka, Yokohama; Ken Honma, Machida, all of Japan

[73] Assignee: Mitsubishi Kasei Corporation, Tokyo, Japan

[21] Appl. No.: 138,205

[22] Filed: Oct. 20, 1993

Related U.S. Application Data

[63] Continuation of Ser. No. 681,066, Apr. 5, 1991, Pat. No. 5,310,859.

[51] Int. Cl.$^5$ .................................................. C08G 63/00
[52] U.S. Cl. ........................... 528/308; 528/100; 528/104; 528/106; 528/110; 528/112; 528/176; 528/193; 528/194; 528/272; 528/300; 524/5
[58] Field of Search ............. 528/308, 272, 300, 100, 528/104, 106, 110, 112, 176, 193, 194; 524/5

[56] References Cited

U.S. PATENT DOCUMENTS 4,581,443 4/1986 Garg ................................. 528/480

FOREIGN PATENT DOCUMENTS 2166685 5/1986 Japan .

*Primary Examiner*—John Kight, III
*Assistant Examiner*—Duc Truong
*Attorney, Agent, or Firm*—Oblon, Spivak, McClelland, Maier & Neustadt

[57] ABSTRACT

A method for producing a liquid crystalline polyester, which comprises reacting compounds of the following formulas:

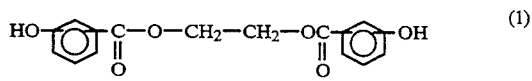

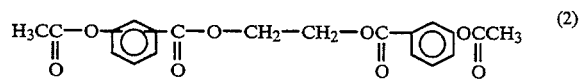

and a dicarboxylic acid of the following formula

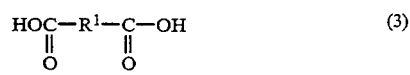

wherein $R^1$ is a bivalent aromatic hydrocarbon group having from 6 to 18 C atoms as starting material, for polycondensation in a molten state.

9 Claims, 14 Drawing Sheets

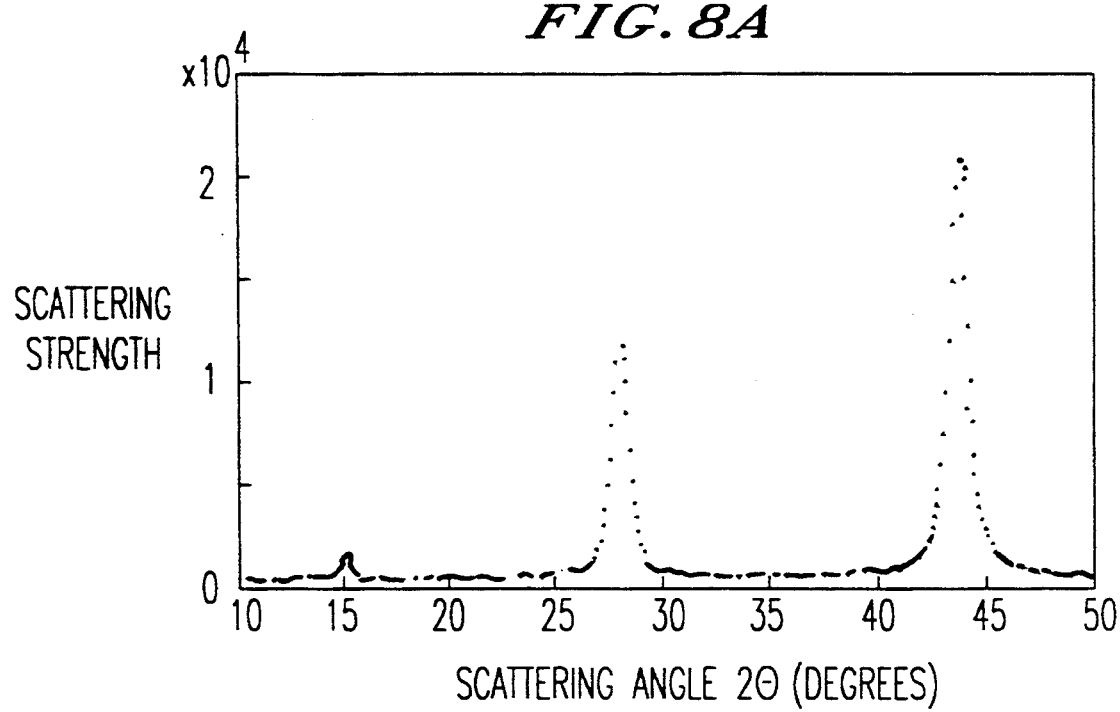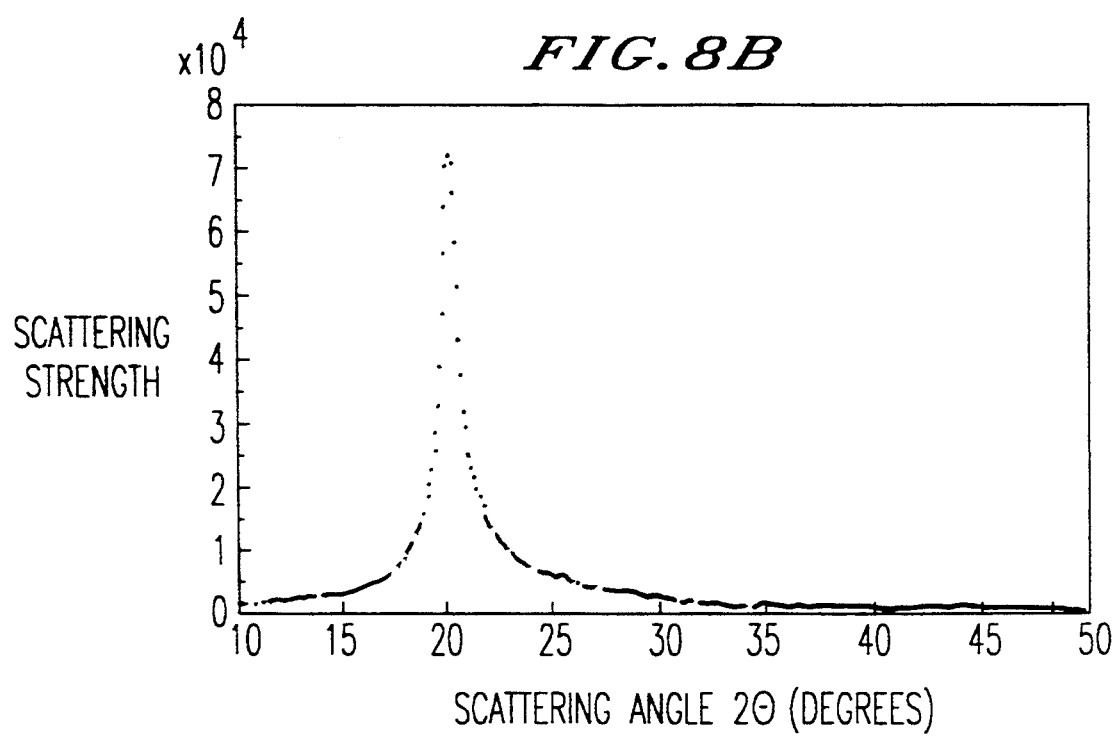

LIQUID CRYSTALLINE POLYESTERS AND METHODS FOR THEIR PRODUCTION

This is a continuation of application Ser. No. 07/681,066, filed on Apr. 5, 1991 now U.S. Pat. No. 5,310,859.

The present invention relates to novel liquid crystalline polyesters wherein the sequence is alternately controlled and methods for their production. The liquid crystalline polyesters of the present invention have not only high modulus of elasticity, high tensile strength, high flexural strength and high impact strength but also a high level of elongation, and they are tough. Further, with the same composition and the same compositional ratio, they are superior to conventional products not only in the mechanical properties but also in heat resistance. The liquid crystalline polyesters of the present invention exhibit these characteristics, as they form thermotropic liquid crystals during the molding and the sequence is alternately well controlled. Furthermore, they have also a characteristic that with the same composition and the same compositional ratio, they show high fluidity even at a low temperature side as compared with the conventional products. Therefore, they are very useful as molding materials for products such as films or fibers. As molding materials, they are particularly suitable for automobile parts, electrical and electronical parts, thin molded products and precision molded products. They also have a merit that they can be polymerized at a relatively low temperature in spite of their high heat resistance, since the difference between the solid heat resistance temperature and the sufficiently meltable temperature is small.

In recent years, there has been a increasing demand for base materials having excellent modulus, strength, elongation and heat resistance for all types of products such as fibers, films and molded products. Polyesters have been used widely for molded products of general use. However, many polyesters are poor in the flexural modulus and flexural strength and thus unsuitable for applications where a high modulus of elasticity or high strength is required.

In recent years, an attention has been drawn to liquid crystalline polyesters as polyesters suitable for applications where a high modulus of elasticity and high strength are required. A particular attention has been drawn to them since W. J. Jackson et al reported on a thermotropic liquid crystalline polymer comprising polyethylene terephthalate and acetoxybenzoic acid in Journal of Polymer Science, Polymer Chemistry Edition, vol 14 (1976), p. 2043, U.S. Pat. Nos. 3,778,410 and 3,804,805, and Japanese Examined Patent Publication No. 18016/1981. In this report, Jackson et al reported that this liquid crystalline polymer exhibited modulus of at least 5 times, strength of at least 4 times and impact strength of at least 25 times as compared with polyethylene terephthalate, and thus indicated a new possibility for a high performance resin.

However, this polymer by Jackson et al had a drawback that it was very brittle and poor in strength and elongation. This is considered to be attributable primarily to the high proportion of a chain of p-oxybenzoic acid residues, as represented by the following formula (13):

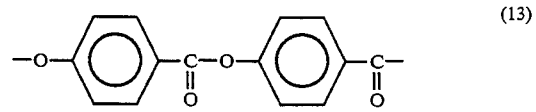

Further, the melting point, the softening point, etc. may vary depending upon the proportion of such chain (13).

On the other hand, many reports are available wherein the molding conditions have been studied using the polymer of Jackson et al. (For example, J. A. Cuculo et al, Journal of Polymer Science, Physical Edition 26 179 (1988)).

According to this report, the higher the molding temperature, the higher the modulus of elasticity, and this is attributable to the fact that a non-melted component exists at a low temperature side, and it gives defects in the high dimensional structure of the molded product. (This indicates that the polymer is in a liquid crystal state only partially.)

This is believed attributable to that the sequence and its distribution as well as the distribution of the composition are widely varied, i.e. non-uniformity is substantial.

This means that high performance of physical properties can not be attained unless the molding temperature is set at a high level relative to the heat resistance in a solid state. It further indicates that since no adequate liquid crystallinity is obtained unless the temperature is at the high temperature side, at the low temperature side i.e. at the melt-initiation temperature or at a temperature slightly higher than the melt-initiation temperature, the fluidity tends to be poor, and molding of a thin product which is a feature of a liquid crystalline polymer, will be impossible.

The present inventors previously found a copolymer polyester having the elongation at breakage of the polyester developed by Jackson et al improved (Japanese Unexamined Patent Publication No. 186527/1985). The concept was to minimize the proportion of the chain (13) of p-oxybenzoic acid units. Here is the basic idea for reducing the chain (13).

However, according to the method disclosed in Japanese Unexamined Patent Publication No. 186527/1985 or the method of Japanese Unexamined Patent Publication No. 186525/1985, only a random polymer was obtainable in spite of the effort to prevent the chain reaction of p-oxybenzoic acid, and the elongation at breakage was still not high enough and the difference between the temperature at which the heat resistance in a solid state can be maintained and the temperature at which adequate fluidity is obtainable, was large.

Japanese Unexamined Patent Publication No. 26632/1989 discloses that with the liquid crystalline polyester obtained by the method of Jackson et al, formation of a highly blocked polymer (high proportion of (13)) formed by block polymerization of p-oxybenzoic acid is attributable to a deterioration of the physical properties, and it is intended to improve the physical properties by random polymerization by means of a two step polymerization method.

However, the polyester obtainable by this method has a high melt viscosity and is poor in the fluidity, and its mechanical properties such as strength and elongation are not good enough, although the heat resistance is high, as confirmed by a duplication test.

This is believed attributable to the fact that p-oxybenzoic acid is polymerized merely randomly as mentioned above.

Further, in Japanese Unexamined Patent Publication No. 45524/1990, an attempt for improvement has been made by a method of continuously or portionwise adding p-hydroxybenzoic acid and acetic anhydride or p-acetoxybenzoic acid. However, when the ratio of

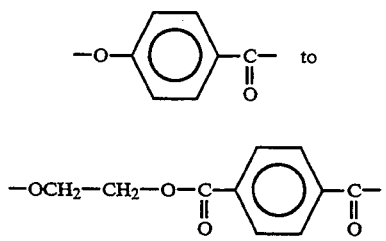

to is 80:20 (molar ratio), HDT (heat distortion temperature) is as low as 150° C., and the melt viscosity at 318° C. is 770 poise, and thus the product is even inferior to that obtained by Japanese Unexamined Patent Publication No. 26632/1989. (See Example 1 of Japanese Unexamined Patent Publication No. 45524/1990.)

Further, the present inventors previously found a copolymer polyester whereby formation of insoluble or infusible particles was controlled (Japanese Unexamined Patent Publication No. 41221/1987). However, this polyester was sometimes inferior in the heat resistance and unsuitable as an engineering plastic.

U.S. Pat. No. 3,890,256 discloses a polyester having improved abrasion resistance. However, this polyester is produced also in the same manner as in Japanese Examined Patent Publication No. 18016/1981, whereby a chain of

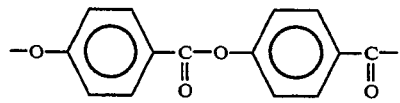

is likely to form. Therefore, insoluble or infusible particles are likely to result, and the elongation at breakage of the resulting polymer tends to be low, and the polymer tends to be brittle. Further, the copolymer component is so high that the heat resistance tends to be inferior.

Further, the above-mentioned U.S. Pat. No. 3,804,805 to Jackson et al includes an example wherein

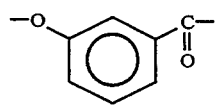

is employed. However, as confirmed by a duplication test, the product was inferior in the heat resistance, and the mechanical properties were not adequate.

Japanese Unexamined Patent Publications No. 267323/1987, No. 285916/1987 and No. 099227/1988 also disclose polymers containing a

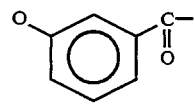

component. However, the polymers thereby obtained are basically the same as the polymer obtained by U.S. Pat. No. 3,804,805, and the heat resistance and the mechanical properties are not adequate.

Japanese Unexamined Patent Publication No. 121095/1977 discloses a method wherein diphenylcarbonate is employed. However, the product obtained by this method is similar to those described above, and the heat resistance and the mechanical properties are not adequate.

Further, Japanese Unexamined Patent Publication No. 317524/1988 proposes a method wherein improvement of the elongation or improvement of the anisotropy of the physical properties is attempted in a system wherein an aliphatic diol or the like other than ethylene glycol is used. However, it does not suggest a method of using ethylene glycol as the sole aliphatic glycol for further improving the above effects (particularly the elongation).

Under these circumstances, the present inventors have conducted extensive researches with an aim to find out a system for a liquid crystalline polyester comprising constituting units of the following formulas (1), (2) and (3):

 (1)

 (2)

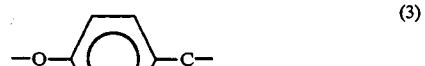 (3)

whereby the mechanical properties such as the tensile strength, flexural strength and impact strength are improved, the elongation at breakage is high and the heat resistance is excellent. While the heat resistance in a solid state is excellent, the polyester exhibits excellent fluidity once a fluid state is initiated, simply by setting the temperature at a slightly high level (such an excellent fluidity can be obtained by raising $T_1$ as far as possible and minimizing $T_2 - T_1$, where $T_1$ is a temperature up to which the polyester shows heat resistance in a solid state and $T_2$ is a temperature at which it shows excellent fluidity), and thus it is excellent in the moldability and it exhibits high crystallinity in a solid state even when it is a copolymer, whereby it is possible to improve the mechanical properties, to improve the resistance against the hydrolysis or to substantially improve the mechanical properties or thermal properties when a filler, etc. are incorporated. We consider it possible to obtain such a system by controlling the sequence or the compositional distribution, more specifically, by adopting a statistically alternating sequence as described hereinafter. As a result, a method for producing a liquid crystalline polyester having the above-mentioned properties has been found. Further, it has been found that the properties can further be improved by incorporating constituting units of the following formula (5):

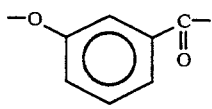

The present invention has been accomplished on the basis of these discoveries.

According to the first aspect, the present invention provides a liquid crystalline polyester comprising dicarboxylic acid units of the following formula (1):

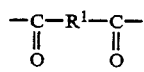

wherein $R^1$ is a bivalent aromatic hydrocarbon group having from 6 to 18 carbon atoms, diol units of the following formula (2):

$$-OCH_2CH_2O- \qquad (2)$$

and p-oxybenzoic acid units of the following formula (3):

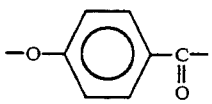

wherein (i) where the moles of said units (1), (2) and (3) are represented by [1], [2] and [3], respectively, they satisfy the following formula (I):

$$0.65 \leq \frac{[3]}{[1] + [3]} \leq 0.88 \qquad (I)$$

(ii) where among the p-oxybenzoic acid units, (a) p-oxybenzoic acid units having on their —O— side a further p-oxybenzoic acid, are represented by the underlined portion of the formula (3-1):

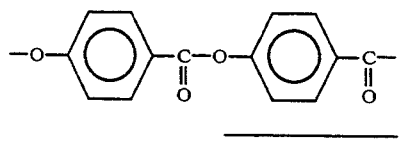

and (b) p-oxybenzoic acid units having on their

side a diol unit of the formula (2), are represented by the underlined portion of the formula (3-4):

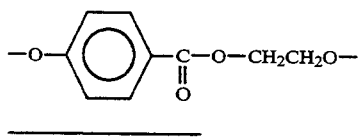

and the moles of (3-1) and (3-4) are represented by [3-1] and [3-4], respectively, at least one of $r_1$ and $r_2$ as defined by the following formulas (II) and (III):

$$\frac{[3-1]}{[3]} = \frac{r_1 \times [3]}{r_1 \times [3] + 2 \times [1]} \qquad (II)$$

$$\frac{[3] - [3-4]}{[3]} = \frac{r_2 \times [3]}{r_2 \times [3] + 2 \times [2]} \qquad (III)$$

satisfies $0 \leq r_1 \leq 0.88$, or $0 \leq r_2 \leq 0.88$, and (iii) the viscosity of a solution of the polyester as measured in p-chlorophenol/o-dichlorobenzene (30° C., concentration: 0.5 g/dl) is at least 0.4 dl/g.

According to the second aspect, the present invention provides a liquid crystalline polyester comprising dicarboxylic acid units of the following formula (1):

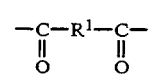

wherein $R^1$ is a bivalent aromatic hydrocarbon group having from 6 to 18 carbon atoms, diol units of the following formula (2):

$$-OCH_2CH_2O- \qquad (2)$$

and oxybenzoic acid units of the following formula (4):

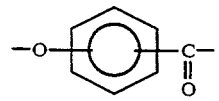

wherein (i) where the moles of said units (1), (2) and (4) are represented by [1], [2] and [4], respectively, they satisfy the following formula (IV):

$$0.65 \leq \frac{[4]}{[1] + [4]} \leq 0.88 \qquad (IV)$$

(ii) where among the oxybenzoic acid units, oxybenzoic acid units having on their

side a diol unit of the formula (2), are represented by the underlined portion of the formula (4-4):

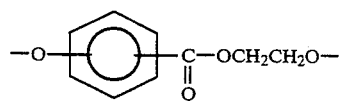

and the moles of (4-4) are represented by [4-4], $r_3$ as defined by the following formula (V):

$$\frac{[4] - [4-4]}{[4]} = \frac{r_3 \times [4]}{r_3 \times [4] + 2 \times [2]} \qquad (V)$$

satisfies $0 \leq r_3 \leq 0.88$, and (iii) the viscosity of a solution of the polyester as measured in p-chlorophenol/o-dichlorobenzene (30° C., concentration: 0.5 g/dl) is at least 0.4 dl/g.

Figure 5:
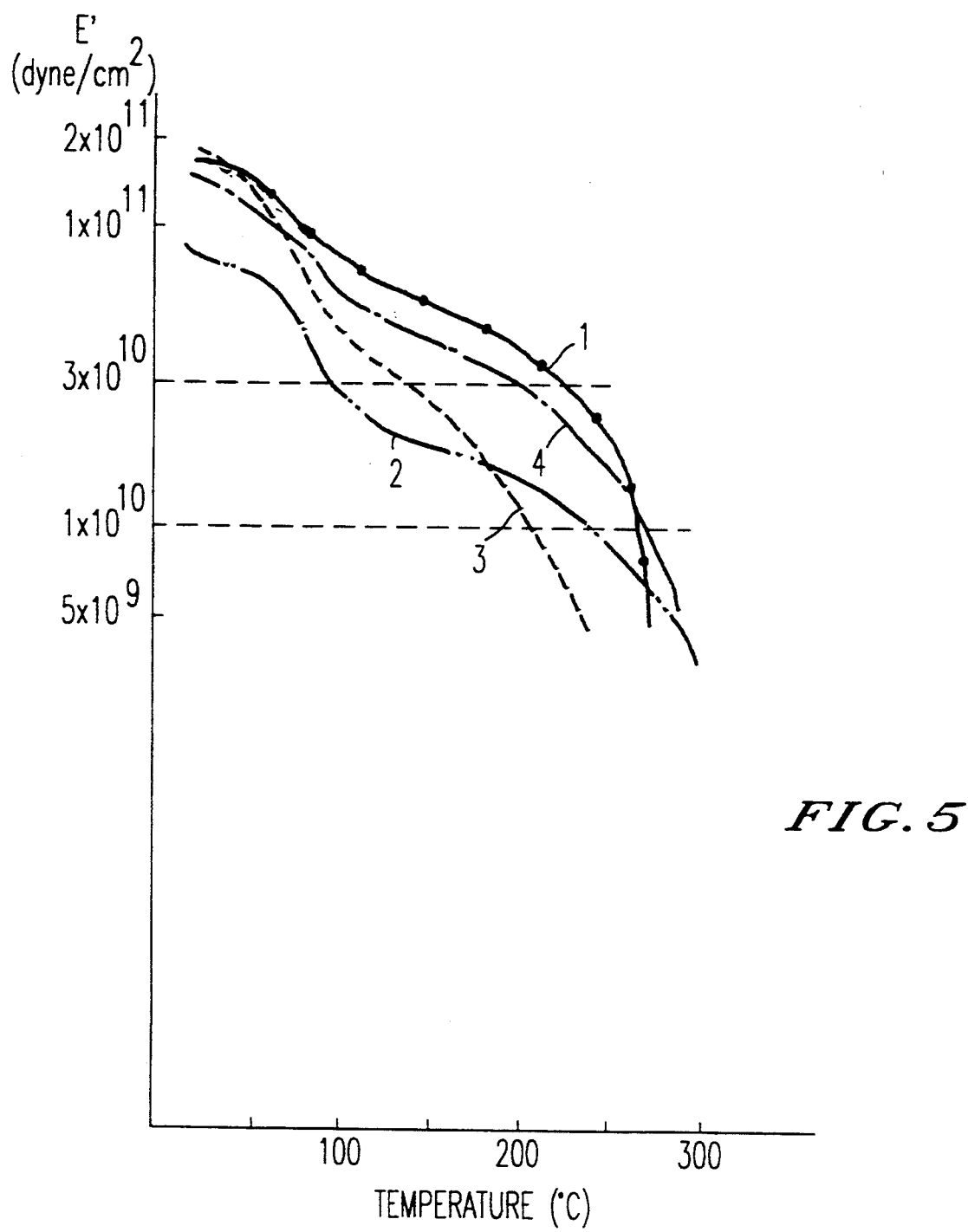

FIG. 5 is a graph showing the vibron data of polymers obtained in Example 1 and Comparative Examples 2, 4 and 5, wherein reference numeral 1 indicates Example 1, numeral 2 indicates Comparative Example 2, numeral 3 indicates Comparative Example 4, and numeral 4 indicates Comparative Example 5.

Figure 6:
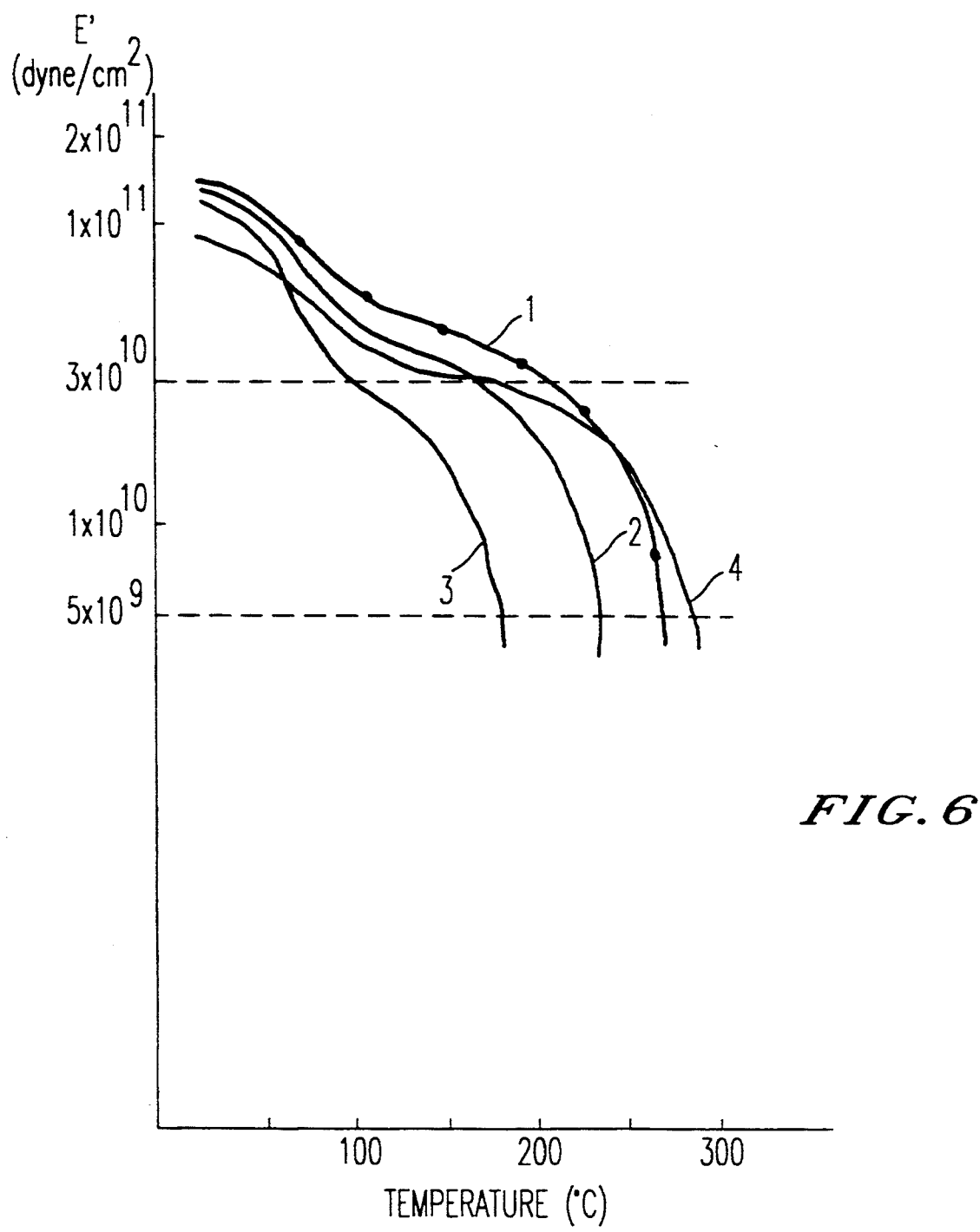

FIG. 6 is a graph showing the vibron data of polymers obtained in Example 1, 2, 3 and 4, wherein reference numeral 1 indicates Example 1, numeral 2 indicates Example 2, numeral 3 indicates Example 3, and numeral 4 indicates Example 4.

Figure 7A:
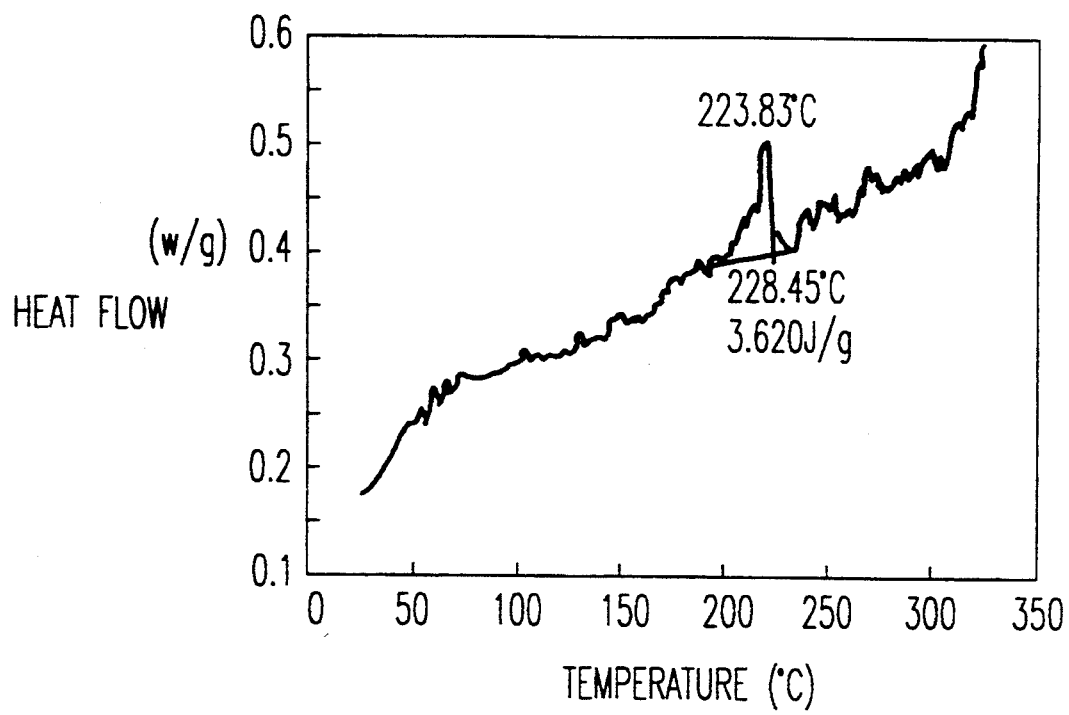

FIGS. 7(A) and (B) are DSC charts of polymers obtained in Example 1. FIG. 7(A) shows the data during the temperature drop, and FIG. (B) shows the data during the temperature rise.

FIGS. 8(A) and (B) are graphs showing X-ray scattering patterns in Example 1. FIG. 8(A) shows the data in a meridional direction, and FIG. 8(B) shows the data in an equatorial direction.

Figure 9:
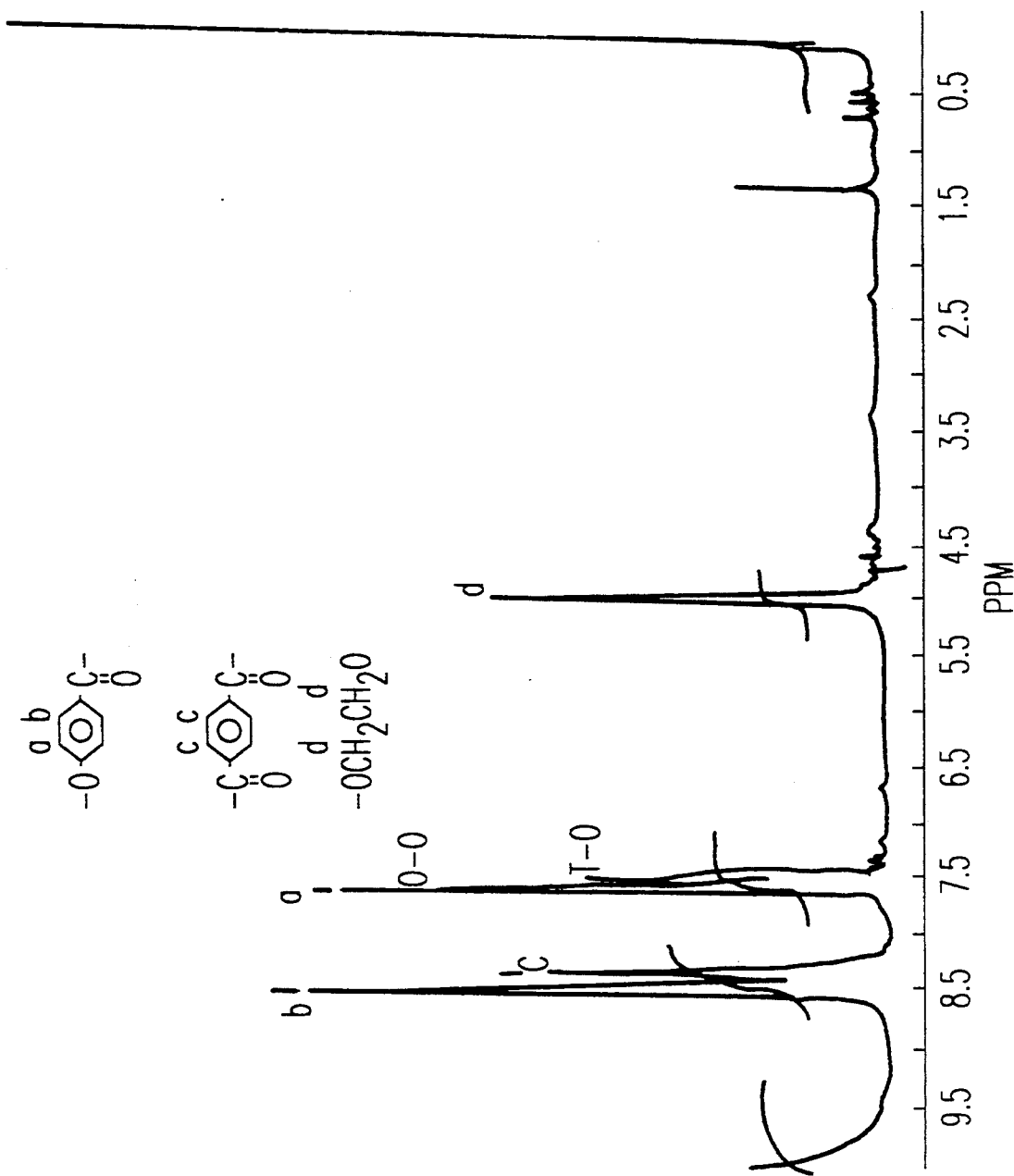

FIG. 9 is a $^1$H-NMR chart used to obtain $r_1$ in Comparative Example 2.

Figure 10:
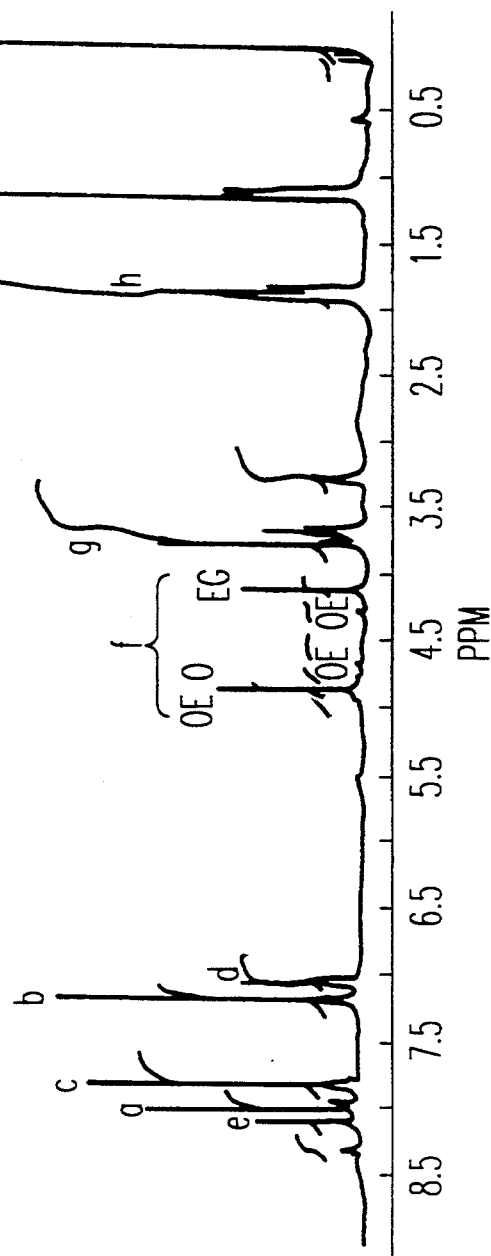

FIG. 10 is a $^1$H-NMR chart used to obtain $r_2$ in Comparative Example 2.

Figure 11:
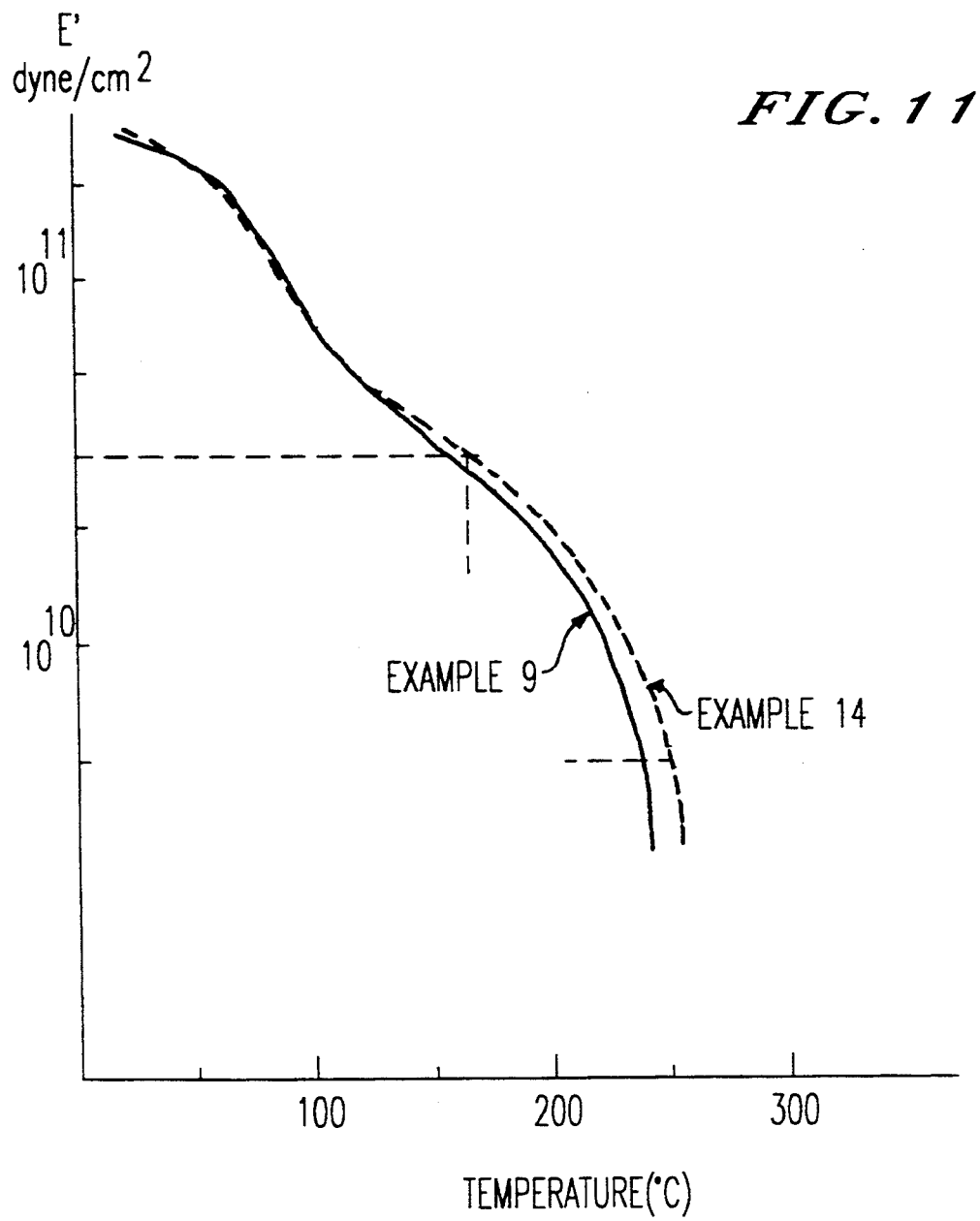

FIG. 11 is a graph showing the vibron data of the polymers obtained in Examples 9 and 14.

Figure 12:
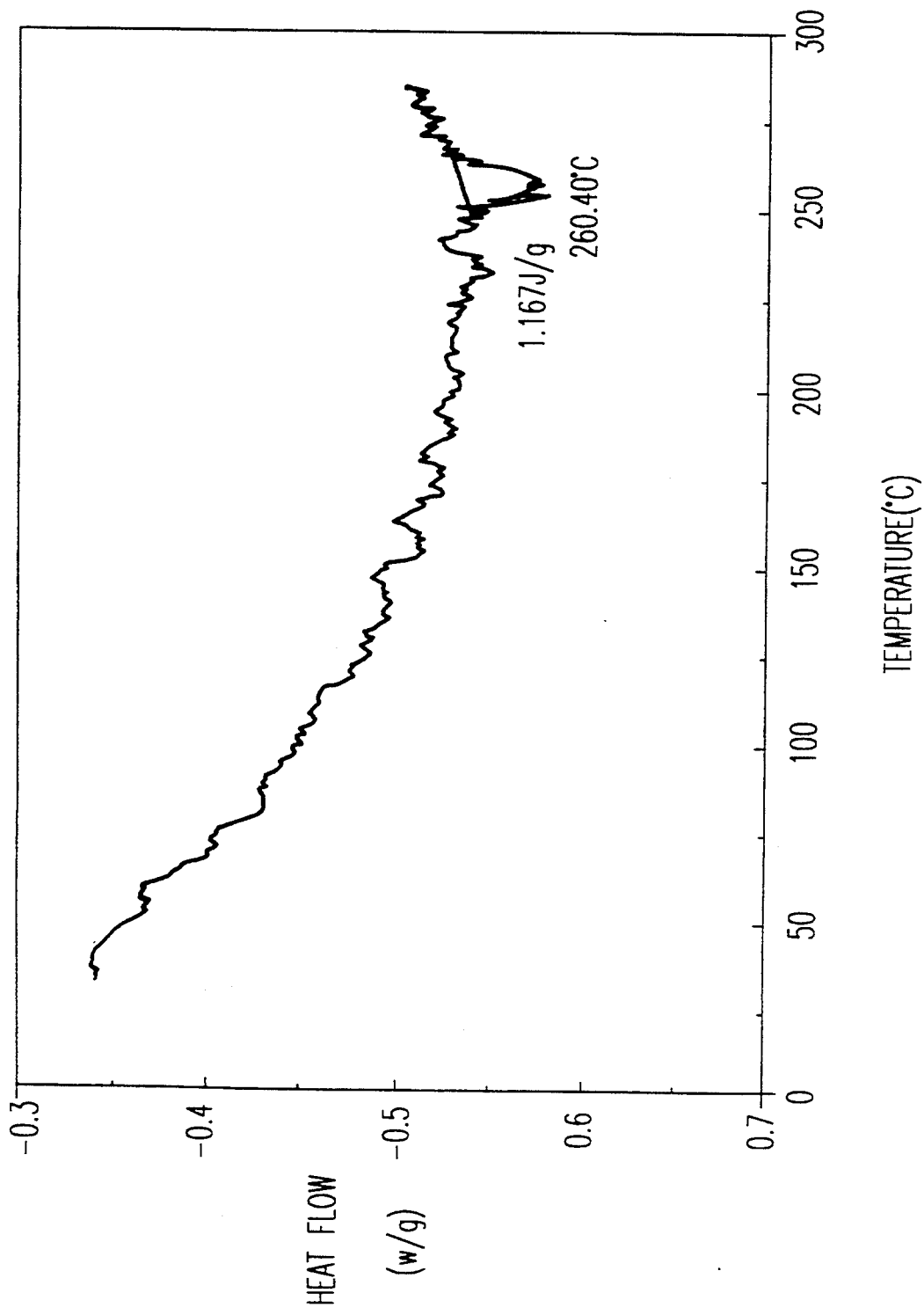

FIG. 12 is a DSC chart (during the temperature rise) of the polymer obtained in Example 14.

Figure 13:
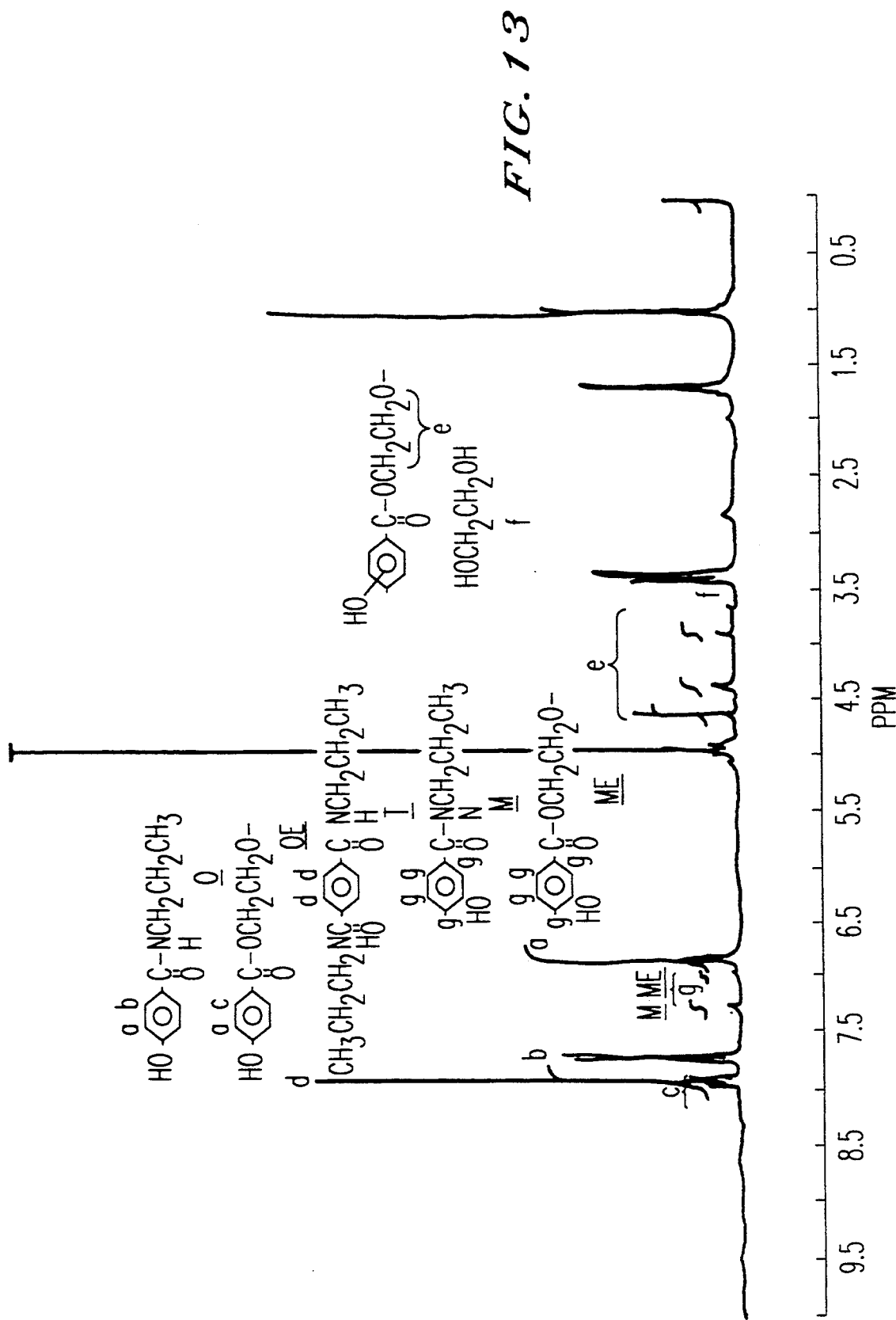

FIG. 13 is a $^1$H-NMR chart after amine decomposition used to obtain $r_3$ in Example 9.

Figure 14:
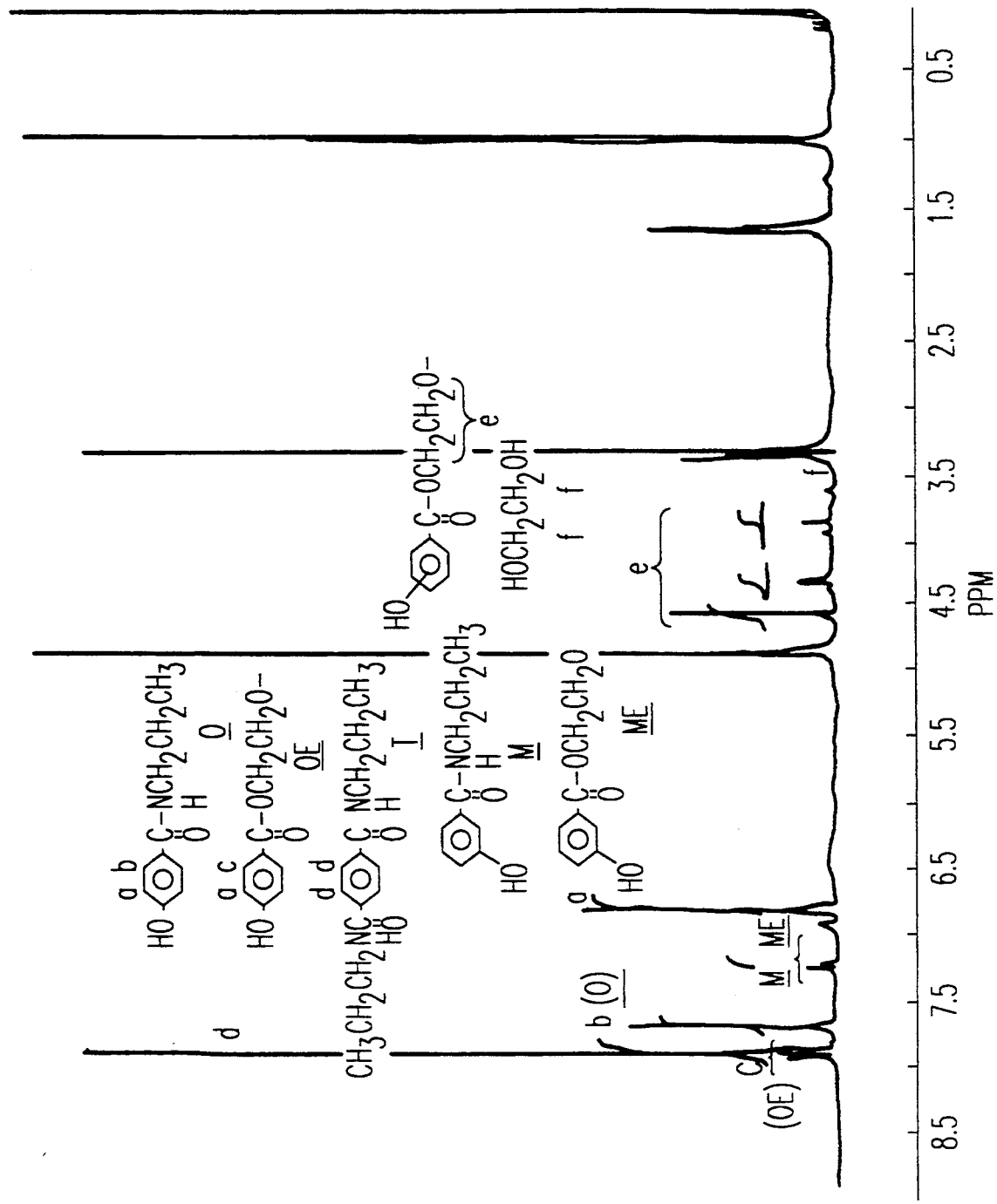

FIG. 14 is a $^1$H-NMR chart after amine decomposition used to obtain $r_3$ in Example 12.

Now, the present invention will be described in detail.

The liquid crystalline polyester of the present invention has a feature that it has high strength and high elongation at breakage, and thus it is a polymer having excellent toughness. Further, among those having the same composition and the same compositional ratio, it has a feature that it has excellent heat resistance in a solid state, and the above-mentioned $T_2-T_1$ is very small, whereby it is moldable at a low temperature. Besides, it has a feature that it is excellent in the mechanical properties when molded at a relatively low temperature i.e. at a temperature slightly higher than the melting point.

Further, such liquid crystalline polyester has a feature that it shows high crystallinity in a solid state, whereby the resistance against hydrolytic decomposition is improved, and the mechanical properties and the thermal properties can be improved when a filler, etc. are incorporated.

Such liquid crystalline polyester has been developed, since the present invention has been accomplished on the basis of the following concept.

Namely, in the production of a polymer comprising the following constituting units (1), (2) and (3):

 (1)

 (2)

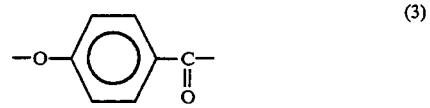 (3)

the desired polymer can be obtained by minimizing structural units of the formula (13) which is a chain of the units of the formula (3):

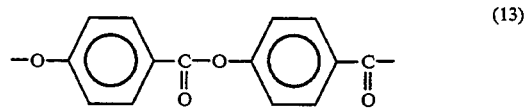 (13)

In Japanese Unexamined Patent Publications No. 186527/1985, No. 26632/1989 and No. 45524/1990 directed to improvement of the conventional liquid crystalline polyester of Jackson et al, the heat resistance and the mechanical properties can be improved, but the improvement is merely a change from a statistically blocky structure of the

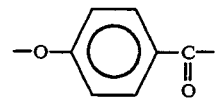

component in the polymer to a statistically random structure, and the randomness was rather qualitative, and the degree of the randomness was not quantitatively analyzed.

The present inventors have found that the above-mentioned physical properties can not be fully satisfied by the random structure of the above component in the polymer, and they can be accomplished for the first time by the alternate presence of the component. Namely, the liquid crystalline polyester of the present invention is required to satisfy at least one of the conditions of $0 \leq r_1 \leq 0.88$ and $0 \leq r_2 \leq 0.88$ where $r_1$ and $r_2$ (sequence forming ratios) are parameters defined by the following formulas (II) and (III), respectively:

$$\frac{[3-1]}{[3]} = \frac{r_1 \times [3]}{r_1 \times [3] + 2 \times [1]} \quad \text{(II)}$$

$$\frac{[3] - [3-4]}{[3]} = \frac{r_2 \times [3]}{r_2 \times [3] + 2 \times [2]} \quad \text{(III)}$$

Preferably, $$\frac{[3] - 2 \times [1]}{[3]} \leq r_1 \leq 0.85$$

$$\frac{[3] - 2 \times [2]}{[3]} \leq r_2 \leq 0.85.$$

More preferably, $$\frac{[3] - 2 \times [1]}{[3]} + 0.2 \times \frac{[1]}{[3]} \leq r_1 \leq 0.83$$

-continued $$\frac{[3] - 2 \times [2]}{[3]} + 0.2 \times \frac{[1]}{[3]} \leq r_2 \leq 0.83.$$

Still more preferably, $$\frac{[3] - 2 \times [1]}{[3]} + 0.4 \times \frac{[1]}{[3]} \leq r_1 \leq 0.80$$

$$\frac{[3] - 2 \times [2]}{[3]} + 0.4 \times \frac{[1]}{[3]} \leq r_2 \leq 0.80.$$

Still further preferably, $$\frac{[3] - 2 \times [1]}{[3]} + 0.6 \times \frac{[1]}{[3]} \leq r_1 \leq 0.78$$

$$\frac{[3] - 2 \times [2]}{[3]} + 0.6 \times \frac{[1]}{[3]} \leq r_2 \leq 0.78.$$

The lower limit for $r_1$ is $$\frac{[3] - 2 \times [1]}{[3]}.$$

Therefore, when $[3] = 2 \times [1]$, it becomes 0. When [3] is larger than this, $$\frac{[3] - 2 \times [1]}{[3]} \leq r_1$$

is proper. However, taking into an error in calculation, etc. into consideration, $$\frac{[3] - 2 \times [1]}{[3]} - 0.03 \leq r_1$$

is preferred.

The same applies to $r_2$. Namely, the lower limit of $r_2$ is $$\frac{[3] - 2 \times [2]}{[3]}.$$

Therefore, when $[3] = 2 \times [2]$, it is 0. However, when [3] is larger than this, $$\frac{[3] - 2 \times [2]}{[3]} \leq r_2$$

is proper. However, taking into an error in calculation, etc. into consideration, $$\frac{[3] - 2 \times [2]}{[3]} - 0.03 \leq r_2$$

is preferred.

More preferably, $r_1$ and $r_2$ are simultaneously in the above-mentioned ranges.

Now, the meanings of these formulas will be described hereinafter. The formulas (II) and (III) were led in accordance with the disclosure by B. Vollmert, Polymer Chemistry; Springer-Verlag; NY 1973, p.117–123.

The meanings of the above formulas will now be specifically described.

When the sequence of units of the formula (3) is considered, it is necessary to distinguish the ether side (—O— side) from the carbonyl side

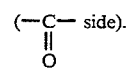

Namely, on the ether side of the unit (3), two different types of units can be bonded, as shown by a dotted line (....) in the following formulas (3-1) and (3-2):

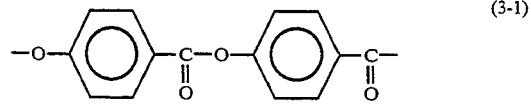

(3-1)

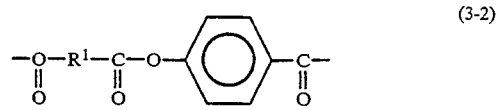

(3-2)

Likewise, on the carbonyl side, two different types of units can be bonded, as shown by the following formulas (3-3) and (3-4):

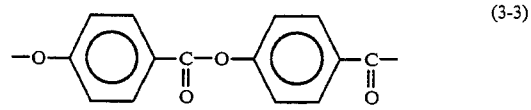

(3-3)

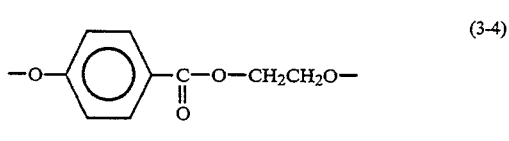

(3-4)

Here, when the moles of the units corresponding to the underlined portions of the formulas (3-1), (3-2), (3-3) and (3-4) are represented by [3-1], [3-2], [3-3] and [3-4], respectively, $[3] \approx [3\text{-}1] + [3\text{-}2]$ $[3] \approx [3\text{-}3] + [3\text{-}4]$ However, since there may be terminal groups, or the main chain may contain acid anhydride bonds of the formula:

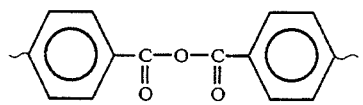

The left hand side and the right hand side of the above two formulas i.e.

$\{[3] \approx [3\text{-}1] + [3\text{-}2]\}$ and $\{[3] \approx [3\text{-}3] + [3\text{-}4]\}$ would not necessarily be equal. Namely, [3-2] and [3-4] would not necessarily be equal.

As a further chain of units, a chain of the formula:

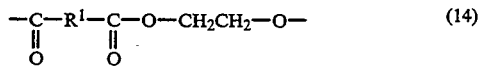
(14)

is conceivable.

Practically significant are the following two formulas (II) and (VIII):

$$\frac{[3-1]}{[3]} = \frac{r_1 \times [3]}{r_1 \times [3] + 2 \times [1]} \quad (II)$$

$$\frac{[3-3]}{[3]} = \frac{r_2 \times [3]}{r_2 \times [3] + 2 \times [2]} \quad (VIII)$$

In the analytical method for obtaining $r_2$ which will be described hereinafter, [3-4] and [3] will be obtained rather than [3-3].

Therefore, assuming [3-3]=[3]- [3-4], the formula (VIII) is represented by the following formula (III) for the sake of convenience:

$$\frac{[3] - [3-4]}{[3]} = \frac{r_2 \times [3]}{r_2 \times [3] + 2 \times [2]} \quad (III)$$

The proportions of (1), (2) and (3) will be described hereinafter. In the formula (II), values obtained by a NMR method of the polymer were employed, and in the formula (III), values obtained by a NMR method of an amine decomposition product were employed. The proportions of (1), (2) and (3) can also be obtained by a gas chromatography method after methanol decomposition, and the results obtained by this method agreed very well with the results obtained by the NMR method.

Now, the meanings of $r_1$ and $r_2$ will be described.

In general, there is a concept called a monomer reactivity ratio for the production of a copolymer. Namely, where two monomers $M_1$ and $M_2$ are present, and the probability for $M_1$ to enter a position adjacent to the active species $\sim M_1^*$ is represented by $W_{11}$ and the concentrations of $M_1$ and $M_2$ are represented by $[M_1]$ and $[M_2]$, respectively, the probability $W_{11}$ is represented by the following formula:

$$W_{11} = \frac{R_1[M_1]}{R_1[M_1] + [M_2]}$$

where $R_1 = k_{11}/k_{12}$; $k_{11}$ is a reaction rate constant for $M_1$ to enter the position adjacent to $\sim M_1^*$, and $k_{12}$ is a reaction rate constant for $M_2$ to enter the position adjacent to $\sim M_1^*$.

Thus, $R_1$ is a ratio of the reaction rate constants for $M_1$ and $M_2$ to enter the position adjacent to $\sim M_1^*$. In general, $W_{11}$ may sometimes be obtained by analyzing the polymer. In the case of a chain polymerization of a vinyl compound, $R_1$ may sometimes be obtained from the amounts of the monomers consumed (or from the proportions of units in the polymer).

On the other hand, in a case like the reaction system of the present invention, the reactions are successive, and a side reaction such as ester exchange has to be considered. Therefore, the reactivity ratio $R_1$ of the monomers does not simply determine the composition or the sequence of the polymer.

However, the same concept can be employed. Namely, although the reactivity ratio of the monomers can not be determined, once $W_{11}$ can be determined from the polymer according to the same concept, the formativity ratio of the sequence can be determined therefrom.

Namely, $W_{11}$ can be replaced by $$\frac{[M_1 - M_1]}{[M_1]}$$

where $[M_1 - M_1]$ is the concentration of $M_1$ having $M_1$ at the adjacent position.

Therefore, the present inventors have adopted $r_1$ anew and have named it as a sequence formativity ratio. We have defined $r_1$ by using the following formula which is similar to the above-mentioned formula:

$$\frac{[3-1]}{[3]} = \frac{r_1[M_1]}{r_1[M_1] + [M_2]} \quad \frac{[3-1]}{[3]}$$

represents the ratio of (3-1) to (3)
i.e. the probability that units of the formula (3) are in the form of (3-1):

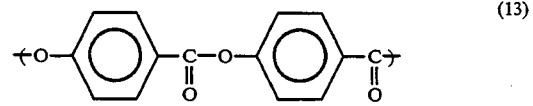
(13)

When $r_1 > 1$, (3) takes a statistically blocky sequence to (1), where the larger the value $r_1$, the higher the blocking nature, i.e. the larger the proportion of [13].

When $r_1 \approx 1$, (3) takes a statistically random sequence to (1). This means that the ratio of [13] to [3] in the polymer is the same as the proportion of [3] when [3] and [1] constitute the entire composition.

Further, when $r_1 < 1$, the proportion of [13] tends to be small. Namely, this means that (3) tends to be statistically alternate relative to (1). The smaller the value $r_1$, the more the alternate sequence. When $r_1 = 0$, there will be no formation of [13].

However, when the proportion of [3] increases to a level of $[3] > 2 \times [1]$, $r_1$ will be represented substantially by the following formula:

$$\frac{[3] - 2 \times [1]}{[3]} \leq r_1$$

When $$r_1 = \frac{[3] - 2 \times [1]}{[3]},$$

the polymer will be an ideal alternating copolymer.

From the opposite aspect, this means that when $r_1 > 1$, the proportion of the sequence represented by the formula:

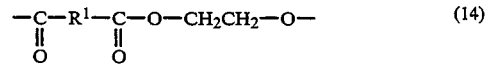
(14)

is high.

When $r_1 \approx 1$, the sequence of (14) is a statistically random.

When $r_1 < 1$, the sequence of (14) is less.

Namely, a conventional liquid crystalline polyester having the same composition and the same compositional ratio, has a higher proportion of the sequence of (14) than the polyester of the present invention.

This is believed attributable to the fact that it has been difficult to reduce the sequence of (14) according to conventional methods.

Now, $r_2$ will be discussed.

Also with respect to $r_2$, the formula (III) was prepared, paying an attention to the constituting units on the carbonyl side of the units of the formula (3).

Thus, $r_2$ is defined by the formula (III):

$$\frac{[3] - [3 - 4]}{[3]} = \frac{r_2 \times [3]}{r_2 \times [3] + 2 \times [2]} \qquad \text{(III)}$$

$$\frac{[3] - [3 - 4]}{[3]}$$

represents the ratio of ([3]- [3-4]) to [3], i.e. the probability that units of the formula (3)

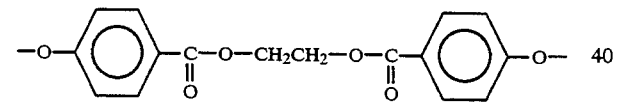

are in the form other than

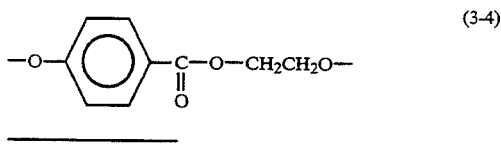

In this case, for example,

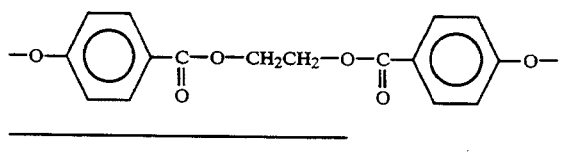

is taken as containing two units of the formula corresponding to the underlined portion of the formula (3-4):

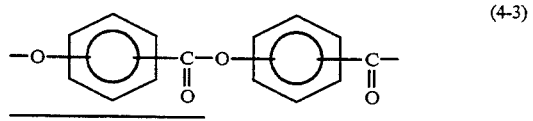 (3-4)

Namely, they are two units as identified by the two underlines in the following formula:

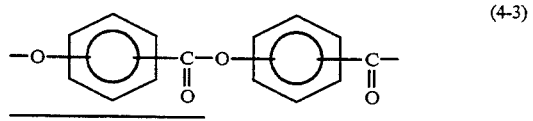

When $r_2 > 1$, (3) takes a statistically blocky sequence to (2).

When $r_2 \approx 1$, (3) takes a statistically random sequence to (2).

Further, when $r_2 < 1$, (3) takes a statistically alternate sequence to (2).

Further, in a case of a polymer comprising four constituting units including a small amount of a kink component of the formula (5):

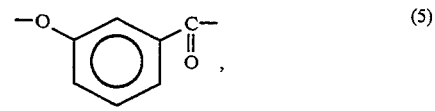 (5)

parameter $r_3$ (sequence formativity ratio) defined by the following formula (V):

$$\frac{[4] - [4 - 4]}{[4]} = \frac{r_3 \times [4]}{r_3 \times [4] + 2 \times [2]} \qquad \text{(V)}$$

is required to satisfy a condition represented by the following formula:

$$0 \leq r_3 \leq 0.88$$

preferably $$\frac{[4] - 2 \times [2]}{[4]} \leq r_3 \leq 0.85$$

more preferably, $$\frac{[4] - 2 \times [2]}{[4]} + 0.2 \times \frac{[2]}{[4]} \leq r_3 \leq 0.83$$

a still more preferably, $$\frac{[4] - 2 \times [2]}{[4]} + 0.4 \times \frac{[2]}{[4]} \leq r_3 \leq 0.80$$

most preferably, $$\frac{[4] - 2 \times [2]}{[4]} + 0.6 \times \frac{[2]}{[4]} \leq r_3 \leq 0.78.$$

As mentioned above, however, when $[4] > 2 \times [2]$, $$\frac{[4] - 2 \times [2]}{[4]} \leq r_3$$

is proper. However, taking an error in calculation into consideration, it is preferred to employ the following formula:

$$\frac{[4] - 2 \times [2]}{[4]} - 0.03 \leq r_3$$

In the same manner as in the case of $r_2$, the meanings of the above formulas will be specifically described as follows. With respect to the sequence of the oxybenzoic acid unit of the formula (4), two different types of units can be bonded on its carbonyl side as indicated by dotted line (....) in the following formulas (4-3) and (4-4).

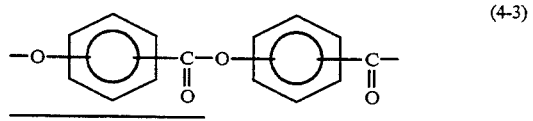 (4-3)

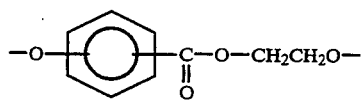
(4-4)

Here, when the moles of the units corresponding to the underlined portion in the formulas (4-3) and (4-4) are represented by [4-3] and [4-4], respectively,

[4]≃[4-3]+[4-4]

([4]=[3]+[5]).

A practically meaningful formula is as follows:

$$\frac{[4-3]}{[4]} = \frac{r_3 \times [4]}{r_3 \times [4] + 2 \times [2]} \quad (IX)$$

However, by the analytical method for obtaining $r_3$, which will be described hereinafter, [4-4] and [4] are obtainable rather than [4-3]. Therefore, assuming [4-3]=[4]−[4-4], the formula (IX) is represented by the formula (V) for convenience sake:

$$\frac{[4]-[4-4]}{[4]} = \frac{r_3 \times [4]}{r_3 \times [4] + 2 \times [2]} \quad (V)$$

In this case, the calculation should be made based on the proportion of the constituting unit of the formula (3-3):

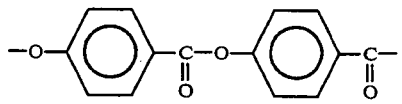
(3-3)

However, by the analytical methods presently available, the unit of the formula (3-3) can not be distinguished from the following units:

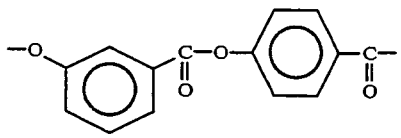
(3-5)

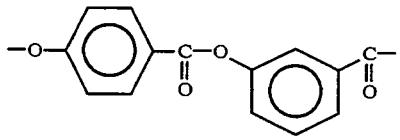
(3-6)

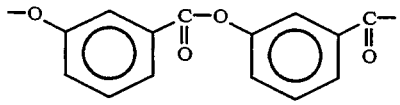
(3-7)

Further, since the unit of the formula (5) is in a small amount as compared with the unit of the formula (3), the proportions of (3-5), (3-6) and (3-7) are substantially small as compared with (3-3).

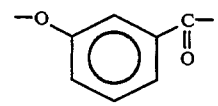
(5)

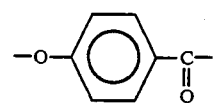
(3)

Therefore, on an assumption that the small proportion of (4-3) corresponds to a small proportion of (3-3), $r_3$ was calculated in the same manner as $r_2$.

In the case of the liquid crystalline polyester of Jackson et al, (3) takes a block structure to (1). This has been proved by V. A. Nicely et al of the same Eastman group (Macromolecules, 20, 573, (1987)). Nicely et al use the following formula:

$$\frac{[3-1]}{[3]} = \frac{m \times [3]}{[3]+[1]}$$

and determine whether or not the product has a block structure on the basis of whether m is larger than 1. This is based on an idea that judgment be made on the basis of whether the proportion of [3-1] is larger or smaller than the proportion of [3] when [3] and [1] constitute the entire composition. The method by the present inventors is believed to be better than this method as a standard for judgment. In any case, it has been already proved that the polymer of Jackson et al has a block structure since m=1.3. (However, their measurement is restricted within a range of $$\frac{[3]}{[1]+[3]} \leq 0.7.$$

Whereas, the present inventors have measured also within a range of $$\frac{[3]}{[1]+[3]} > 0.7$$

this time, which has proved again that the polymer has a block structure.)

Those disclosed in Japanese Unexamined Patent Publications No. 186527/1985, No. 26632/1989 and No. 45524/1990 have also random structures.

However, it can not be denied that there has been an alternating system known for a polyester of a composition similar to the present invention. For example, R. W. Lenz et al have prepared a polyester of alternating system using a compound of the formula (6-1) and

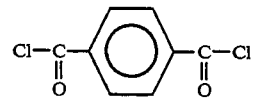

by an interfacial method (a solution method) (Polymer Journal 14 (1) 9 (1982)). However, $\eta_{inh}$ is as low as 0.178, whereby the mechanical properties desired for a polyester can not be expected. (British Polymer Journal 12 (4) 132 (1980) presents an article by the same authors, and although there is no disclosure of $\eta_{inh}$, from other data, the product is considered to be the same as disclosed in the above-mentioned Polymer Journal.)

Further, there has been a report on a study as to the difference in melt between a completely alternating system and a non-alternating system with respect to a compositional system other than the present invention (S. I. Stupp et al, Macromolecules 21 1228 (1988)). It is certainly true that in an alternating system, the range for transformation from solid to liquid crystal is narrow. However, for the alternating system in this article, monomers have to be sequentially synthesized, and the synthesis of the monomers is not easy. Besides, no mechanical properties of the product has been examined.

The liquid crystalline polyester of the present invention wherein at least one of $r_1$, $r_2$ and $r_3$ as defined above is less than 0.88, has, for example, the following characteristics.

1. It has high tensile strength and flexural strength.
2. It has high impact strength.
3. It has high elongation at breakage.
4. With the same composition and the same compositional ratio, the heat resistance is high.
5. Since $T_2 - T_1$ is small, it is possible to lower the molding temperature.
6. A product molded at a lower temperature has better mechanical properties.
7. The apparent activating energy of the melt viscosity is small.
8. The crystallinity is high.
9. The resistance against hydrolyric decomposition is excellent.
10. The effects of incorporation of fillers, etc. are distinct.

Further, the physical properties of the polymer of the present invention are far superior in the balance of the mechanical properties and the thermal properties to the conventional products, although it may be inferior in certain individual physical properties. Further, the fact that the molding temperature can be lowered in spite of the high heat resistance, means that the polymerization temperature for its production can be lowered, and it is possible to produce a polymer having excellent heat resistance by a conventional apparatus.

$R^1$ in the dicarboxylic acid units of the formula (1) is a bivalent aromatic hydrocarbon group having from 6 to 18 carbon atoms. Specifically, it includes, for example,

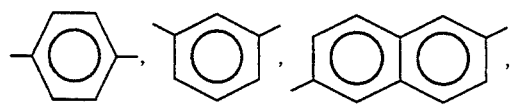

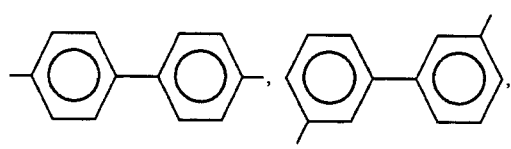

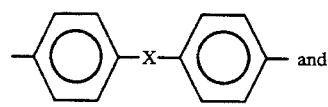

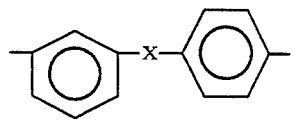

(wherein —X— includes, for example, —O—, —S—, —SO$_2$—, —CH$_2$— and —C(CH$_2$)$_2$—). These aromatic hydrocarbon groups may be used alone or in combination as a mixture to form a copolymer. Among them,

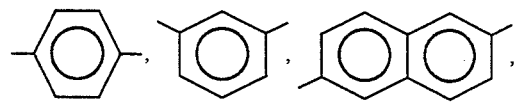

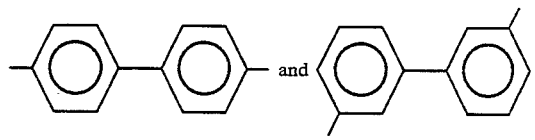

are preferred. When used alone,

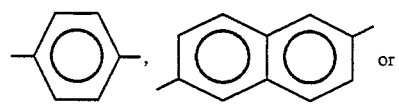

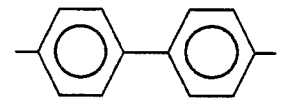

is preferred. Particularly preferred is

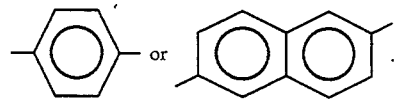

When used in combination as a mixture, at least one of the units is preferably selected from

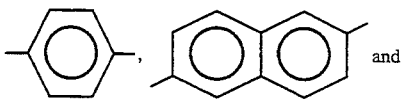

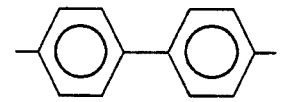

and a total of such units preferably constitutes at least 50 mol %, more preferably at least 66 mol %.

As a preferred mixed system, a combination of

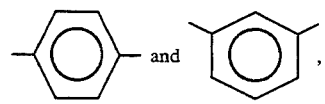

-continued

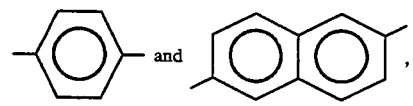

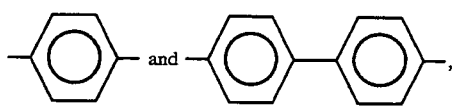

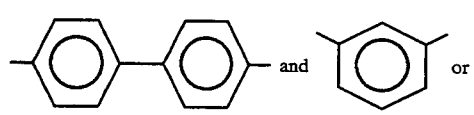

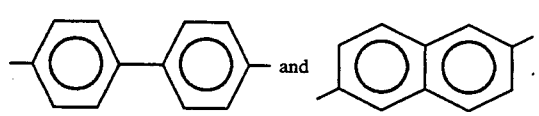

may be mentioned. These groups may be used in a combination of three or more different types, but it is preferred to use up to two different types.

In the present invention, the ratio of the moles [1] and [3] of the units of the above formulas (1) and (3) is required to satisfy the following formula from the viewpoint of production:

$$0.65 \leq \frac{[3]}{[1] + [3]}$$

Namely, in the process of the present invention,

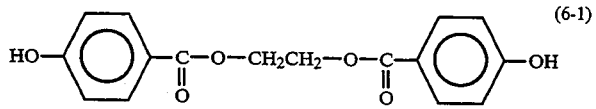 (6-1)

and $$HO-\underset{\underset{O}{\|}}{C}-R^1-\underset{\underset{O}{\|}}{C}-OH \qquad (8)$$

are required, and when

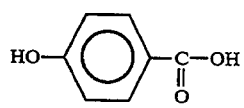 (9-1)

is not added thereto, the ratio will necessarily be:

$$\frac{2}{3} \leq \frac{[3]}{[1] + [3]}$$

The liquid crystalline polyester of the present invention can, of course, be produced by a method other than the method of the present invention. Even in such a case, however, it is necessary to satisfy $$0.65 \leq \frac{[3]}{[1] + [3]}$$

Namely, if $$\frac{[3]}{[1] + [3]} < 0.65,$$

the heat resistance tends to be low, such being undesirable. From the viewpoint of heat resistance, $$0.68 \leq \frac{[3]}{[1] + [3]}$$

is preferred, and $$0.70 \leq \frac{[3]}{[1] + [3]}$$

is more preferred. When

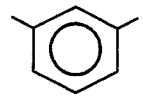

is used for (1), $$0.75 \leq \frac{[3]}{[1] + [3]} \leq 0.85$$

is particularly preferred. On the other hand, the upper limit is $$\frac{[3]}{[1] + [3]} \leq 0.88.$$

If the ratio exceeds this upper limit, the absolute value of the chain of p-oxybenzoic acid units tends to be large, such being undesirable. Within this condition, $$0.68 \leq \frac{[3]}{[1] + [3]} \leq 0.86$$

is preferred, and $$0.70 \leq \frac{[3]}{[1] + [3]} \leq 0.85$$

is particularly preferred. The ratio of [1] to [2] is usually $$0.80 \leq \frac{[1]}{[2]} \leq 1.2,$$

preferably $$0.85 \leq \frac{[1]}{[2]} \leq 1.15,$$

more preferably $$0.90 \leq \frac{[1]}{[2]} \leq 1.10,$$

with a view to increasing the degree of polymerization.

In order to improve the resistance against hydrolyric decomposition, $$0.80 \leq \frac{[1]}{[2]} \leq 1.0$$

is further preferred. When the terminal groups are to be sealed, $$1.0 \leq \frac{[1]}{[2]} \leq 1.2$$

is preferred, to the contrary.
When

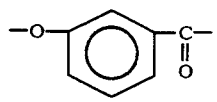

is used, the molar ratio is usually $$0.65 \leq \frac{[4]}{[1]+[4]} \leq 0.88,$$

preferably $$0.68 \leq \frac{[4]}{[1]+[4]} \leq 0.86,$$

more preferably $$0.70 \leq \frac{[4]}{[1]+[4]} \leq 0.85,$$

most preferably $$0.75 \leq \frac{[4]}{[1]+[4]} \leq 0.85.$$

Then, with respect to $$\frac{[5]}{[3]+[5]},$$

$$0.02 \leq \frac{[5]}{[3]+[5]} \leq 0.15$$

is preferred, $$0.02 \leq \frac{[5]}{[3]+[5]} \leq 0.13$$

is more preferred, and $$0.02 \leq \frac{[5]}{[3]+[5]} \leq 0.08$$

is particularly preferred.

From the viewpoint of the heat resistance and crystallinity, the smaller the [5], the better. If $$0 < \frac{[5]}{[3]+[5]} < 0.02,$$

the strength and elongation are not up and the heat resistance tends to be substantially low, such being undesirable. From the viewpoint of the strength or elongation, the larger the [5], the better. Therefore, the amount of [5] should be determined from the balance between the mechanical properties and the thermal properties. In any case, the product of the present invention is better in such a balance than the conventional products of Comparative Examples.

The polyester of the present invention does not substantially contain units of the formula (15) which is disclosed in Japanese Unexamined Patent Publication No. 186527/1985:

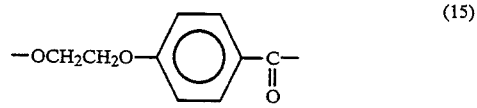

If it contains such units, the heat resistance tends to be substantially low, such being undesirable. Further, the crystallinity also tends to be low. However, if units of the formula (15) are present, the moles of (15) shall not be included in the moles of [3].

Now, the measuring method for the units of (1), (2), (3), (3-1), (3-2), (3-4), (4) and (4-4) and the calculation for $r_1$, $r_2$ and $r_3$ will be described.

Firstly, with respect to $r_1$, the calculation is basically the same as the method of Nicely et al mentioned above.

Namely, $r_1$ was obtained by means of $^1$H-NMR. For NMR, AM-500 manufactured by BRUKER was used, and trifluoroacetic acid or a solvent mixture of trifluoroacetic acid and pentafluorophenol, was used as the solvent. The measurement was conducted at room temperature in the case of the system using trifluoroacetic acid alone and at 60° C. in the case of the solvent mixture system of trifluoroacetic acid and pentafluorophenol. From each $^1$H-NMR spectrum, the signal intensity of each of the signal ($H_2$:7.55 ppm) derived from (3-1):

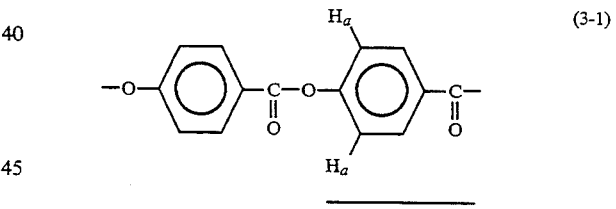

and the signal ($H_b$: about 7.45 ppm) derived from the chain (3-2) of the dicarboxylic acid unit (1) and the p-oxybenzoic acid unit (3):

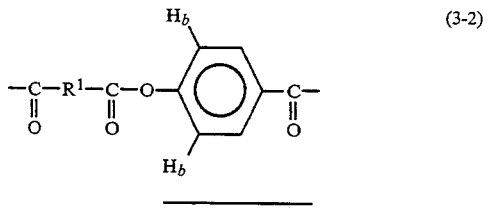

was obtained, and further from the signals at about 8.3 ppm and about 8.5 ppm, the ratio of (1) to (3) was obtained, and $r_1$ was calculated therefrom. According to this method, it is possible to obtain information of the sequence on the —O— side of the compound of the formula (3).

Now, with respect to the method for determining $r_2$ and $r_3$, these values could not be obtained from NMR of the polymer. Under the circumstances, the present inventors have conducted an extensive study and have found a method for obtaining $r_2$ and $r_3$. Namely, it has surprisingly be found that when the liquid crystalline polyester of the system of the present invention is reacted with a primary amine, the ester bonds of the formula (4-4) such as

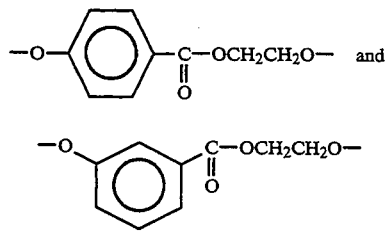

remain selectively without being cleaved, while other ester bonds (such as ester bonds of e.g. (3-3) and (3-2) and (14)) are cleaved. By utilizing this, it is possible to analyze the sequence of the liquid crystalline polyester of the system of the present invention. More specifically, this method comprises pulverizing e.g. the liquid crystalline polyester of the system of the present invention, treating the pulverized sample with a large excess amount of n-propylamine at 40° C. for 90 minutes, and then quantitatively analyzing the decomposition product thereby obtained by the same 500 MHz $^1$H-NMR as described above. The $^1$H-NMR measurement is conducted by using deuterated methanol, a solvent mixture of deuterated DMSO and deuterated methanol, or deuterated trifluoroacetic acid, as the solvent, to quantitatively analyze (3-4) and (4-4). The proportions of (2), (3) and (5) were calculated by using the respectively identified peak intensities. According to this method, information on the sequence on the

side of the units (3) and (4) will be obtained. Based on such information, $r_2$ and $r_3$ were calculated.

The proportion of (1), (2), (3) or (5) was measured by further enlarging FIGS. 1-4, FIGS. 9, 10 or FIGS. 13, 14. As an error, when $$\frac{[1]}{[3]} = \frac{20}{80}, \text{ the error is } \frac{20 \pm 0.5}{80 \pm 0.5}.$$

From the foregoing discussion, $r_1$ and $r_2$ or $r_3$ may appear to be the same. However, there is a substantial difference from the viewpoint of the above described analytical methods. Namely, (3-1) and (3-2) can be distinguished by $^1$H-NMR, and $r_1$ can therefore be expressed by means of [3-1]. However, by the amine decomposition method, (3) and (3-4) are distinguished rather than (3-3) and (3-4). Accordingly, $r_2$ is accurately expressed by means of [3]- [3-4]. Because of terminal groups, etc., [3-1] and {[3]- [3-4]} are not necessarily equal. Also from the viewpoint of precision in measurement, they may not necessarily be equal. The same as to $r_2$ applies to $r_3$. As described in the foregoing, the proportion of (1), (2) or (3), or (1), (2), (3) or (5) was obtained also by gas chromatography after methanol decomposition. The data agreed very well to the data obtained by the NMR method.

Such a more alternating polyester is considered to be uniform not only with respect to the sequence but also with respect to the compositional distribution. For example, according to the vibron data shown in FIGS. 5 and 6, it is evident that only the polyester of the present invention satisfies $0 \leq a \leq 80°$ C. where $a = T_2 - T_1$ where $T_1$ is the temperature at which $E' = 3 \times 10^{10}$ dyne/cm$^2$ as an index for heat resistance ($E'$ is storage modulus) and $T_2$ is the temperature at which $E' = 5 \times 10^9$ dyne/cm$^2$ as the minimum temperature for sufficient fluidity. Preferably $0 \leq a \leq 75°$ C., more preferably $0 \leq a \leq 70°$ C., still more preferably $0 \leq a \leq 65°$ C., and most preferably $0 \leq a \leq 60°$ C. When a m-substituted component as the kink component is contained, $0 \leq a \leq 90°$ C., preferably $0 \leq a \leq 85°$ C., more preferably $0 \leq a \leq 80°$ C. The smaller the value a, the lower the temperature for fluidity in spite of high heat resistance in a solid state.

In a case where the constituting units are solely (1), (2) and (3) and $R^1$ is

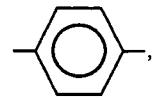

$$T_1 \geq \frac{[3]}{[1]} \times 53° \text{ C.}$$

is satisfied (provided $$2 \leq \frac{[3]}{[1]} \leq 4.3).$$

Therefore, $T_1$ can be controlled by the compositional ratio.

From the viewpoint of the mechanical properties, when $R^1$ in the units (1) is

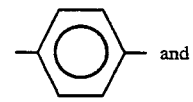

$$\frac{[3]}{[1]} \approx \frac{80}{20},$$

the liquid crystalline polyester of the present invention shows an improvement in the elongation at breakage by at least about 20% and an improvement in the strength by from about 10 to 20% as compared with conventional liquid crystalline polyesters. As mentioned above, according to the present invention, a $(T_2 - T_1)$ is small. This means that the polymer has heat resistance and can be molded at a low temperature, and at that time, the melt viscosity is very low, since it is melted in its entirety. This corresponds to the fact that the sequence is statistically alternating i.e. the values of $r_1$, $r_2$ and $r_3$ are small.

By tracing the change of the structure due to the temperature change by a small angle X-ray scattering method, it can be confirmed that no structure (particularly no high dimensional structure) remains after being melted. (Further, the change in the crystal structure can be ascertained by a wide angle X-ray scattering method as described hereinafter.)

As the sequence becomes more alternating i.e. more uniform, it can be expected that with the same compositional ratio, the crystallinity will be improved. This can be confirmed by measuring the crystallinity by DSC or X-ray scattering.

It is possible to ascertain the presence or absence of crystals or to compare the sizes or types of crystals, by $\Delta H$ at Tc by DSC, or by the peak intensities or the value at $2\theta$ by X-ray. Especially in the case of the same compositional ratio, when molding is conducted under the same molding conditions, if there is a difference in the primary structure, particularly in the sequence, such a difference can be ascertained by two types of analyses. For example, if a rod is prepared and its wide angle X-rays are measured to study the scattering patterns in the equatorial direction and in the meridional direction, it becomes apparent that as compared with the conventional polymers having the same composition and the same compositional ratio, the polymer of the present invention has features that the size of the crystal lattice is small, and the distance between crystal molecules is small.

The solution viscosity $\eta_{inh}$ of the liquid crystalline polyester obtained by the present invention can be determined as follows.

Using p-chlorophenol/o-dichlorobenzene=1/1 (weight ratio) as the solvent, a sample is dissolved therein at room temperature to obtain a solution having a concentration of 0.5 g/dl, and the measurement is conducted at 30° C. The solution viscosity is obtained by the following formula.

$$\eta_{inh} = \frac{\ln t/t_0}{0.5}$$

$t_0$: Falling velocity (sec) in the blank (the solvent only)

$t$: Falling velocity (sec) in the solution at a concentration of 0.5 g/dl

The polyester of the present invention has a characteristic that with the same composition and the same compositional ratio, the melt viscosity is small and the fluidity is improved relative to the degree of polymerization (the solution viscosity may be used as an index of the polymerization degree). If this solution viscosity $\eta_{inh}$ is less than 0.4 dl/g, the mechanical properties tend to be poor, such being undesirable. Preferably $\eta_{inh} \geq 0.5$, more preferably $\eta_{inh} \geq 0.6$, most preferably $\eta_{inh} \geq 0.7$. Further, with the liquid crystalline polyester of the present invention, the solution viscosity can be measured by this method, i.e. it can be dissolved substantially completely. This also indicates that there exists no long chain polymer of (3). Further, this indicates also that the compositional distribution is uniform.

The liquid polyester obtained by the present invention can be dissolved in phenol/1,1,2,2-tetrachloroethane=1/1 (weight ratio) or in hexafluoroisopropanol. This indicates that the composition is uniform, and there exists no substantial long chain of (3).

Now, the method for its production will be described.

The production of a polyester which satisfies at least one of $0 \leq r_1 \leq 0.88$, $0 \leq r_2 \leq 0.88$ and $0 \leq r_3 \leq 0.88$ can not be attained by conventional methods such as those disclosed in Japanese Examined Patent Publication No. 18016/1981 and Japanese Unexamined Patent Publications No. 87125/1983, No. 186525/1985, No. 26632/1989 and No. 45524/1990.

As a method for producing a polyester wherein $r_1$, $r_2$ and $r_3$ satisfy the above ranges, the present inventors have considered that in order to prevent formation of a chain of (3), it is advisable to let the units of

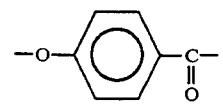

be apart from one another from the stage of starting materials i.e. to use e.g.

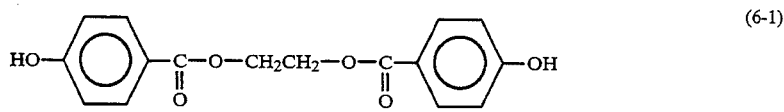  (6-1)

and/or

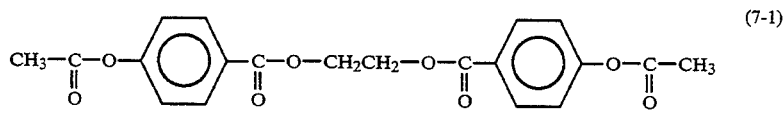  (7-1)

and/or

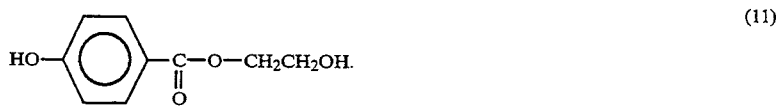  (11)

Namely, when the diol component is

—OCH$_2$CH$_2$O—  (2), as in the present invention, it has commonly been considered that under a high temperature condition ester exchange or acidolysis occurs actively, whereby units of (3) will form a block or random structure. However, it has been unexpectedly found that the component (2) hardly undergoes ester exchange. Namely, with the polymer produced by the method of Jackson et al, the above component (14) remains, and therefore the proportion of the chain of (3) increases. The above-mentioned other methods were designed to let ester exchange or acidolysis occur as far as possible.

Whereas, the present invention is based on an idea of utilizing the phenomenon that the ester exchange of the —OCH$_2$CH$_2$O— component unexpectedly hardly takes place at a high temperature condition.

The method of the present invention will be described in further detail.

Namely, the method comprises adding

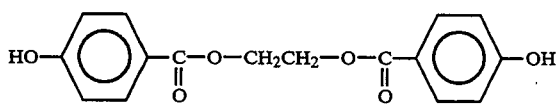
(6-1)

and/or

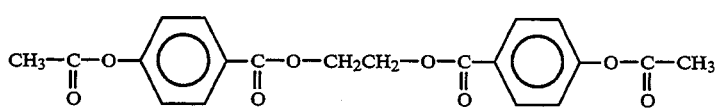
(7-1)

and

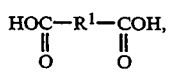
(8)

then, if necessary, adding

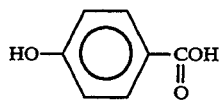
(9-1)

and/or

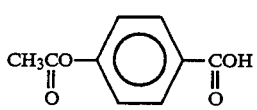
(10-1)

then, if necessary, adding acetic anhydride, and in some cases, (if necessary) further adding

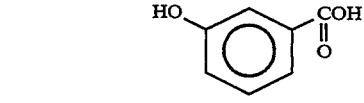
(9-2)

and/or

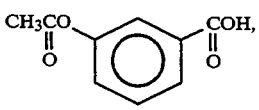
(10-2)

and in some cases, (if necessary) further adding

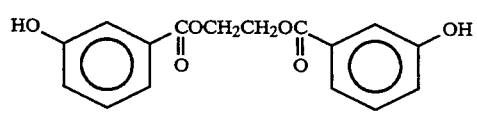
(6-2)

and/or

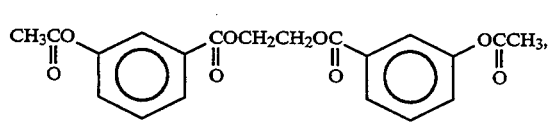
(7-2)

followed by e.g. acetylation at a temperature of from 100° to 170° C. This acetylation is conducted for from 5 minutes to 3 hours, preferably from 20 minutes to 1.5 hours. Acetic anhydride is used preferably in an amount of from the same amount to 1.5 times the amount of the hydroxyl groups in the starting materials. Namely, if the acetic anhydride is represented by (16), and the moles of (6), (9) and (16) are represented by [6], [9] and [16], $$1.0 \leq \frac{[16]}{2 \times [6] + [9]} \leq 1.5$$

is preferred, and $$1.1 \leq \frac{[16]}{2 \times [6] + [9]} \leq 1.4$$

is particularly preferred.

Even in a case where starting materials containing no hydroxyl groups are used, a small amount of acetic anhydride may be employed, since there is a merit that the polymerization rate can thereby be increased. The reaction may be conducted in the absence of a catalyst. Otherwise, a catalyst may be added as the case requires.

Then, the temperature is raised to conduct polymerization. The polymerization is conducted at a temperature of from 220° to 340° C. It is particularly preferred to conduct the polymerization at a temperature of from 260° to 320° C. More preferably, the polymerization is conducted at a temperature of from 265° to 300° C., most preferably from 265° to 280° C. There is a merit that the polymerization can be conducted at a low temperature in spite of the heat resistance in a solid state. Further, the time required for gradually reducing the pressure from 760 mmHg to 1 mmHg is usually at least 30 minutes, preferably at least 60 minutes. It is particularly important to conduct the reduction of the pressure from 30 mmHg to 1 mmHg gradually.

The polymerization can be conducted in the absence of a catalyst, but it is usually conducted in the presence of a catalyst as the case requires. As the catalyst to be used, an ester exchange catalyst, a polycondensation catalyst, an acylation catalyst or a decarboxylic acid catalyst, may be employed. These catalysts may be used in combination as a mixture. Preferred catalysts include, for example, Ti(OBu), BuSnOOH, Sn(OAc)$_2$, Sb$_2$O$_3$, Fe(acac)$_3$, Zn(OAc)$_2$, Co(OAc)$_2$, NaOAc and KOAc. The catalyst is used usually in an amount of from 5 to 50,000 ppm, preferably from 50 to 5,000 ppm, relative to the polymer.

The polymerization time may be within 10 hours. It is particularly preferred to conduct the polymerization within 7 hours. Most preferably, it is conducted within a range of from 1 to 4 hours.

As mentioned above, there is a merit in that this polymerization can be conducted at a low temperature. There is a further merit that even at a low temperature, the product can be easily withdrawn without any trouble. This is also considered attributable to the fact that the sequence is well controlled.

The feeding ratio of

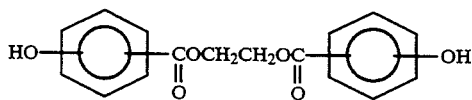

and/or

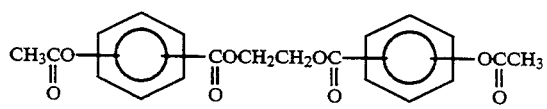

and

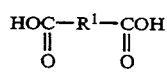

is preferably $$0.85 \leq \frac{[6] + [7]}{[8]} \leq 1.15,$$

more preferably $$0.9 \leq \frac{[6] + [7]}{[8]} \leq 1.1.$$

Likewise, the feeding ratio of

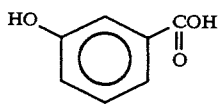

and/or

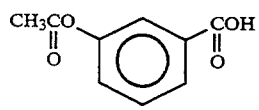

and/or

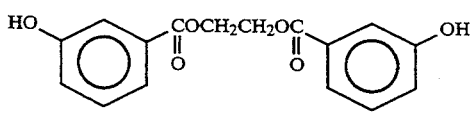

and/or

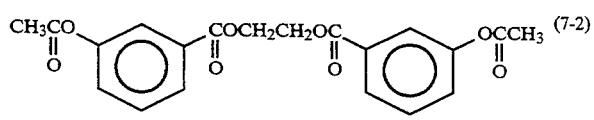

is usually $$0 \leq \frac{2 \times ([6-2] + [7-2]) + [9-2] + [10-2]}{2 \times ([6] + [7]) + [9] + [10]} \leq 0.3,$$

preferably $$0 \leq \frac{2 \times ([6-2] + [7-2]) + [9-2] + [10-2]}{2 \times ([6] + [7]) + [9] + [10]} \leq 0.2.$$

If the above value exceeds 0.3, the heat resistance tends to be low, and the crystallinity tends to deteriorate, whereby the fluidity tends to be poor, such being undesirable.

It is preferred to use

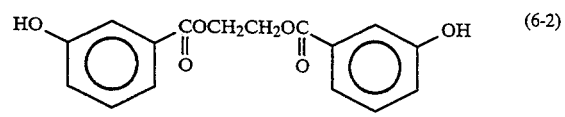

and

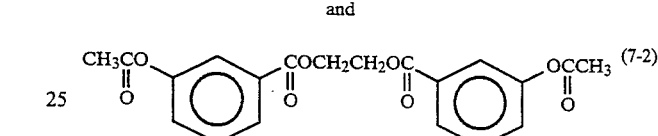

rather than

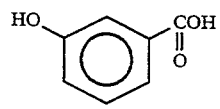

and

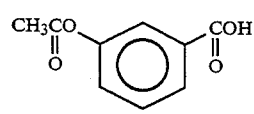

for improving the physical properties and increasing the rate of polymerization.

The ratio of [9] and [10] is usually $$0 \leq \frac{[9] + [10]}{[6] + [7]} \leq 6,$$

preferably $$0.5 \leq \frac{[9] + [10]}{[6] + [7]} \leq 4,$$

more preferably $$1 \leq \frac{[9] + [10]}{[6] + [7]} \leq 3,$$

Now, a method wherein a compound of the following formula (11) is used, will be described.

Acetic anhydride is added to

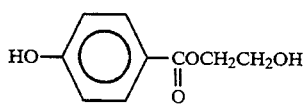

$$HOC-R^1-COH \quad (8)$$
$$\quad \parallel \quad \parallel$$
$$\quad O \quad \quad O$$

and a compound of the formula (9) and/or a compound of the formula (10):

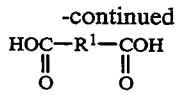 (9)

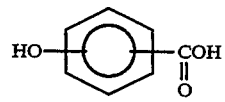 (10)

as the starting materials, followed by acetylation at a temperature of from 100° to 170° C. This acetylation is conducted for from 5 minutes to 3 hours, preferably from 20 minutes to 1.5 hours. Acetic anhydride is used usually in amount of $$1.0 \leqq \frac{[16]}{[9]+[11]} \leqq 1.5$$

The compounds (11), (8), (9) and (10) may preliminarily be reacted prior to the acetylation. Otherwise, the compounds (11), (9) and (10) may preliminarily be reacted prior to the acetylation. In such a case, the molar ratio is preferably within a range of $$1.0 \leqq \frac{[9]+[10]}{[11]} \leqq 4.0,$$

more preferably $$1.0 \leqq \frac{[9]+[10]}{[11]} \leqq 2.0.$$

A solvent may be used for this reaction. However, it is preferred to conduct the reaction in the absence of a solvent to avoid the necessity of a subsequence step of removing it. To conduct the reaction of (11) and (9) and/or (8), it is advisable to add (9) and/or (8) into a melt of (11). However, if the temperature is too high, a

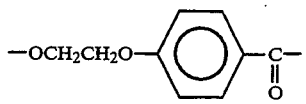

structure tends to be formed by (11) and (9), such being undesirable. Therefore, the temperature is preferably from 145° to 220° C., more preferably from 170° to 210° C. In the case of (11) and (10) and/or (8), a

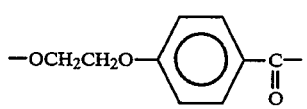

structure is scarcely formed, and the temperature may be slightly high. However, if the temperature is too high, a structure of (13) tends to be formed at the initial state of the reaction, such being undesirable. Specifically, it is preferred to conduct this reaction at a temperature of from 145° to 230° C.

From the viewpoint of the polymerization degree, the ratio of (11) and (8) is preferably $$0.8 \leqq \frac{[8]}{[11]} \leqq 1.2,$$

more preferably $$0.9 \leqq \frac{[8]}{[11]} \leqq 1.1.$$

With respect to the overall feeding ratio, the ratio of (11) and (9), (10) is usually $$1.0 \leqq \frac{[9]+[10]}{[11]} \leqq 5.0,$$

preferably $$1.0 \leqq \frac{[9]+[10]}{[11]} \leqq 3.5.$$

Now, the ratio of (9-1), (9-2), (10-1) and (10-2) as the constituting components of (9) and (10), is preferably $$0 \leqq \frac{[9-2]+[10-2]}{[9-1]+[10-1]} \leqq 0.35,$$

more preferably $$0 \leqq \frac{[9-2]+[10-2]}{[9-1]+[10-1]} \leqq 0.25,$$

most preferably $$0 \leqq \frac{[9-2]+[10-2]}{[9-1]+[10-1]} \leqq 0.20.$$

if $$\frac{[9-2]+[10-2]}{[9-1]+[10-1]} > 0.35,$$

the heat resistance tends to be low, and the liquid crystallinity also tends to be low, whereby the fluidity tends to deteriorate.

The whole or part of (8) and the whole or part of (10) may be added during the acetylation or after the acetylation. After completion of the acetylation, the temperature is raised to initiate the polymerization. The polymerization is conducted at a temperature of from 220° to 340° C., preferably from 260° to 320° C., more preferably from 265° to 300° C. Particularly preferred is from 265° to 290° C., and most preferred is from 265° to 280° C. If the temperature is lower than 260° C., the polymerization speed tends to be slow. On the other hand if it exceeds 320° C., the physical properties of the resulting polymer tend to be poor. As to the catalyst, the same as described with respect to the above-mentioned method will apply. This method has a merit that pipings, etc. will not be soiled since sublimation is little.

The difference between the method of the present invention and the method disclosed in Japanese Unexamined Patent Publication No. 317524/1988 is that as mentioned above, the inventors of Japanese Unexamined Patent Publication No. 317524/1988 did not consider it possible to improve the physical properties when the aliphatic glycol was ethylene glycol only, and they stated that ester exchange or acidolysis of $C_3$ or higher was difficult, and they have overcome this difficulty. Further, referring to the earlier application (Japanese Unexamined Patent Publication No. 186525/1985) by the present inventors, they considered it possible to conduct acidolysis sufficiently by using ethylene glycol in this method, and therefore they did not intend to improve the physical properties by ethylene glycol only, from the very beginning.

As mentioned above, the present inventors have considered that ester exchange or acidolysis is not sufficient even in the case of ethylene glycol, and therefore it is advisable to minimize the chain of

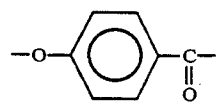

from the very beginning of the production. This is basically different from the way of thinking by the inventors of Japanese Unexamined Patent Publication No. 317524/1988 such that in the case of ethylene glycol, ester exchange or acidolysis would take place sufficiently.

Further, the liquid crystalline polyester of the present invention exhibits an optical anisotropy in a molten phase. Especially, when melting starts, solid will substantially disappear simply by raising the temperature slightly from the melt-initiation temperature, and substantially all will take a liquid crystalline state. Therefore, the polyester of the present invention has a feature that it is far superior to conventional polyesters in the fluidity as represented by $\eta_{inh}$. Therefore, the moldability is good, and a usual melt-molding such as extrusion molding, injection molding or compression molding can be applied to form it into molded products, films, fibers, etc.

With respect to the melt viscosity, the polyester of the present invention shows liquid crystallinity, whereby the melt viscosity is generally low. For example, the melt viscosity at 275° C. under $10^3$ sec$^{-1}$ is not more than 5000 poise, preferably from 30 to 3000 poise, more preferably from 100 to 2500 poise. Further, in polyester with the same composition and same compositional ratio, with the same $\eta_{inh}$, the product of the present invention will have the lowest melt viscosity at 275° C. Further, it is a feature of the product of the present invention that the ratio of the melt viscosity at 275° C. to the melt viscosity at 290° C. is small. It is also a feature of the product of the present invention that the ratio of the melt viscosity at a temperature higher by from 8° to 18° C. than $T_m$ to the melt viscosity at a temperature higher by from 23° to 33° C. than $T_m$ is small.

The polyester of the present invention has high fluidity and is therefore particularly suitable for e.g. precision molded products. For example, it can be used for automobile parts, parts of information materials such as compact discs or flexible discs, or parts of electronic materials such as connectors, IC sockets, etc.

Further, at the time of molding, fibers such as glass fibers or carbon fibers, fillers such as talc, mica or calcium carbonate, a nucleating agent, a pigment, an antioxidant, a lubricant, or other packing materials or additives such as a stabilizer or a flame retardant, or a thermoplastic resin, may be added to the copolymer polyester of the present invention to impart a desired property to the molded product.

Furthermore, the copolymer polyester of the present invention may be blended with other polymer or may be alloyed with other polymer to obtain a composition having the merits of the two polymers.

Now, the present invention will be described in further detail with reference to Examples. However, it should be understood that the present invention is by no means restricted to such specific Examples.

In the Examples, the melt viscosity was measured by means of a flow tester manufactured by Shimadzu Corporation using a shear rate ($\dot{\gamma}$) of 1000 sec$^{-1}$ and a cylinder nozzle length/diameter=20.

The optical anisotropy (liquid crystallinity) was observed by means of a polarizing microscope provided with a hot stage.

Molding was conducted by a 0.1 oz injection molding machine manufactured by The Japan Steel Works, Ltd., and molded specimens were prepared by means of molds A and B. Further, by a 0.3 oz injection molding machine manufactured by Sumitomo Heavy Industries, Ltd., molded specimens were prepared by means of mold C.

HDT (heat distortion temperature) is a value obtained by taking vibron data from the molded specimens prepared by the 0.1 oz injection molding machine, while HDT is obtained from molded specimens prepared by a 2.5 oz injection molding machine manufactured by Toshiba Kikai from a liquid crystalline polyester developed by us or from a commercial product of liquid crystalline polyester, and utilizing the interrelation between the two.

As the vibron, reovibron manufactured by Toyo Baldwin Co. was used, and molded specimens obtained by means of mold A of the above 0.1 oz injection molding machine was used under 110 Hz.

The Vicat softening temperature was measured by an automatic HDT measuring apparatus manufactured by Toyo Seiki, using as a sample a molded specimen prepared by the above-mentioned 0.1 oz injection molding machine, at a heating rate of 50° C./hr, whereby the temperature at which the needle penetrated in a depth of 1 mm was taken as the softening temperature.

Tensile properties (tensile modulus, tensile strength and elongation at breakage) were measured by means of TENSILON/UTM-IIIL manufactured by Toyo Baldwin Co., with respect to the molded specimens prepared by means of molds A and B of the above 0.1 oz injection molding machine and with respect to the molded specimens prepared by means of mold C of the 0.3 oz injection molding machine.

Figure 7B:
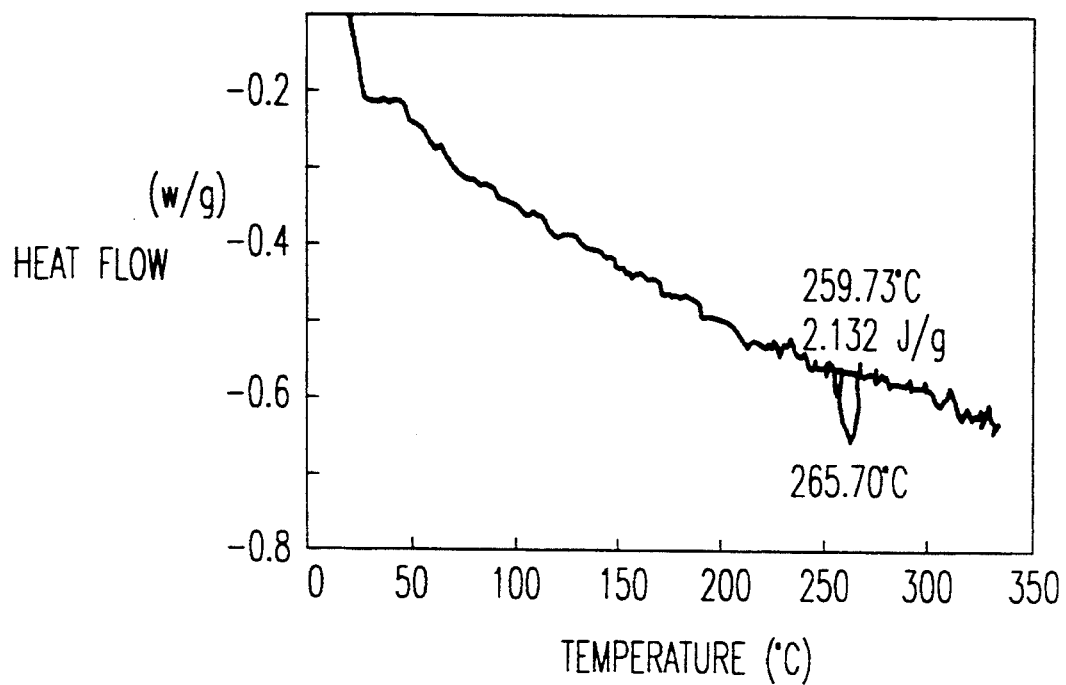

DSC was measured by means of TA2000 manufactured by Du Pont. As the sample, a powder was used, and it was heated to 350° C. at a rate of 20° C./min, then left to stand for 5 minutes and then cooled to 20° C. at a rate of 20° C./min. Then, it was left to stand for 5 minutes and then heated to 350° C. at a rate of 20° C./min. The charts of the cooling step and the second heating step are shown in. FIGS. 7(A) and 7(B).

The X-ray scattering was measured by means of X-ray generating apparatus RAD-B system (maximum output: 12 kW) manufactured by Rigaku Denki K. K. As the sample table, a fiber sample table manufactured by the same company was used. A sample was extruded from a nozzle of 1 φ at 275° C. or 290° C. and molded into a rod shape of 0.37 φ, which was further subjected to heat treatment at 130° C. for 12 hours before use. By this molding, the sample was highly oriented in the direction of extrusion.

With respect to the elongation at breakage as a tensile property, the molded specimens (dumbbell specimens) prepared by the 0.1 oz injection molding machine (mold A, B) and by the 0.3 oz injection molding machine (mold C) usually have low elongation as compared with the molded specimens according to ASTM. Likewise, the molded specimens prepared by means of mold A of the 0.1 oz injection molding machine usually shows a substantially low strength as compared with the molded specimens according to ASTM. Accordingly, if an elongation is at least 3.5% with such molded specimens, such polymer can be regarded as fairly tough. Likewise, if it is less than 3.0%, such polymer can be regarded as brittle.

Izod impact strength was measured in accordance with ASTM D-256 (notched).

REFERENCE EXAMPLE 1

Preparation of

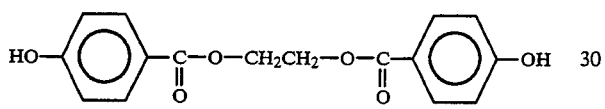

Into xylene, p-hydroxybenzoic acid and ethylene glycol were charged to bring the molar ratio of p-hydroxybenzoic acid/ethylene glycol=2/1, and p-toluenesulfonic acid was charged as a catalyst. The mixture was heated to the reflux temperature of xylene and reacted.

After completion of the reaction, unreacted materials were removed by washing with water to obtain

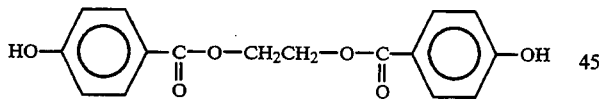

in high purity. The structure was confirmed by $^1$H-NMR.

REFERENCE EXAMPLE 2

Preparation of

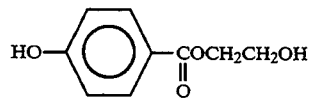

Into an autoclave, 138 parts by weight of p-hydroxybenzoic acid, 1 part by weight of Na$_2$CO$_2$ and 300 parts by weight of isopropanol were charged, and at 90° C., 66 parts by weight of ethylene oxide was added thereto, and the reaction was conducted. After the reaction, the mixture was cooled, and the precipitate was collected by filtration and recrystallized twice from water to obtain 55 parts by weight of p-hydroxylbenzoic acid-β-hydroxyethyl ester

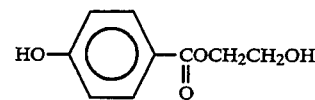

having a melting point of 141° C. The structure was confirmed by $^1$H-NMR.

REFERENCE EXAMPLE 3

Preparation of

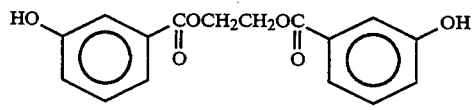

The compound was prepared in accordance with the method disclosed in Kobunshi Kagaku (Polymer Chemistry) 30, 572 (1973). Namely, it was prepared by an ester exchange reaction of m-oxybenzoic acid methyl ester and ethylene glycol, and its structure was confirmed by $^1$H-NMR.

EXAMPLE 1

Into a glass tube equipped with a stirrer, a nitrogen inlet and a vacuum port, 48.6 g (0.161 mol) of

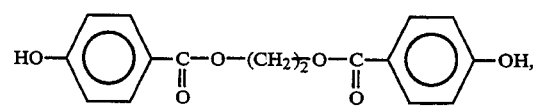

26.7 g (0.161 mol) of

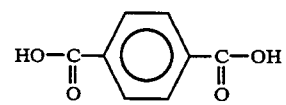

and 44.4 g (0.322 mol) of

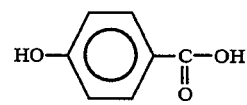

were charged, and the glass tube was flushed with nitrogen under vacuum. Then, 82.1 g (0.81 mol) of acetic anhydride was added thereto, and the system was heated to 140° C. under stirring and maintained at 140° C. for one hour. Then, the system was heated to 275° C. over a period of 1.5 hours. When the temperature reached 275° C., vacuuming was started. It was initially planed to reduce the pressure to 10 mmHg in one hour and then from 10 mmHg to 1 mmHg over a period of 1.5 hours. However, when the pressure was reduced to 6 mmHg after one hour and 55 minutes from the initiation of the vacuuming, the torque was sufficiently high, and therefore the polymerization was terminated.

Then, the system was left to stand still, and the pressure was returned to a normal level. Then, the formed polymer was discharged from the bottom of the glass tube. The dischargeability was excellent.

The polymer was formed into chips and dried under vacuum at 120° C. overnight. This polymer had $\eta_{inh}$ of 0.98, and the melt viscosity was as shown in Table 1.

Figure 1:
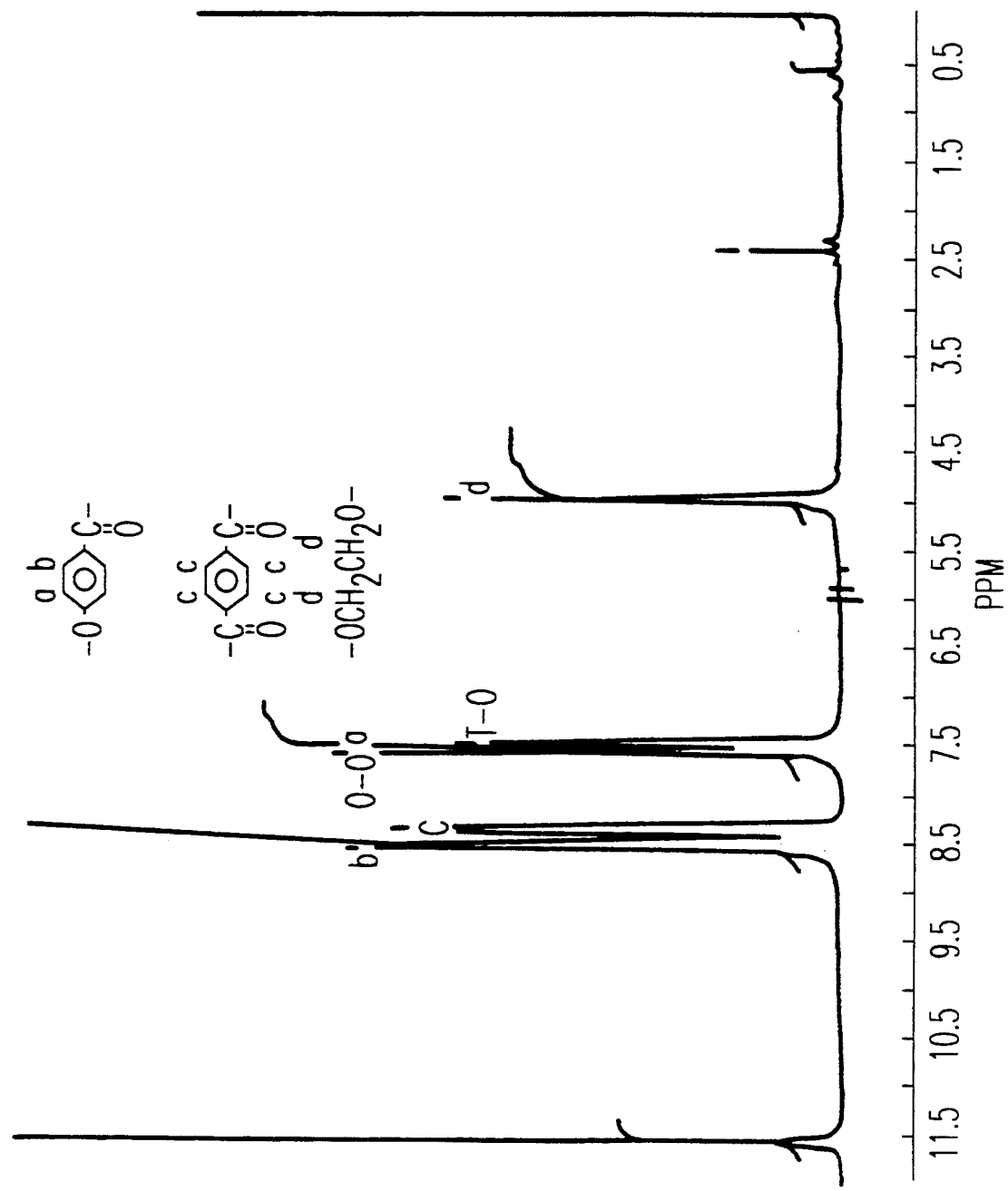
FIG. 1 is a $^1$H-NMR chart used to obtain $r_1$ in Example 1.
Figure 2:
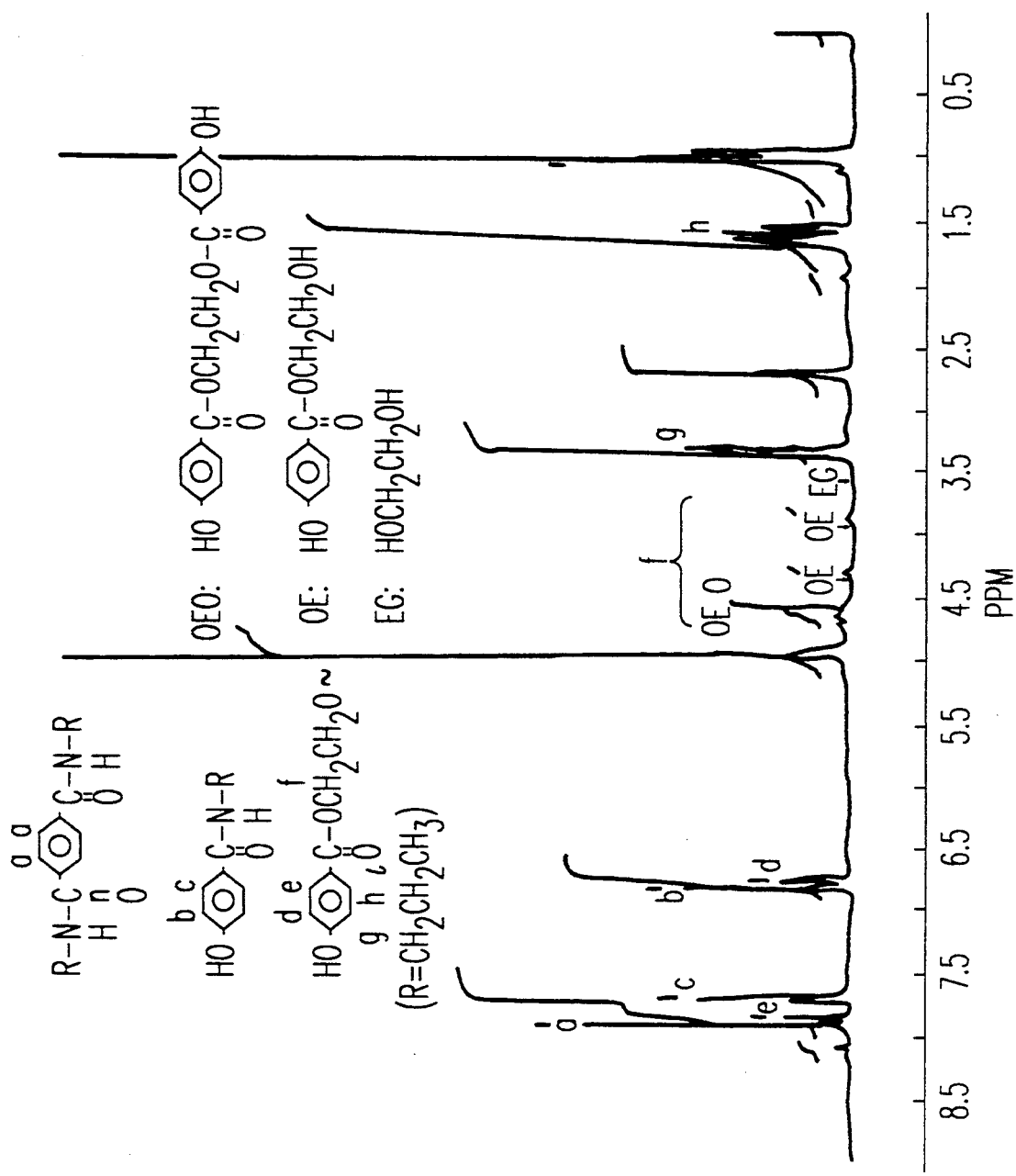
FIG. 2 is a $^1$H-NMR chart after amine decomposition used to obtain $r_2$ in Example 1.
Figure 3:
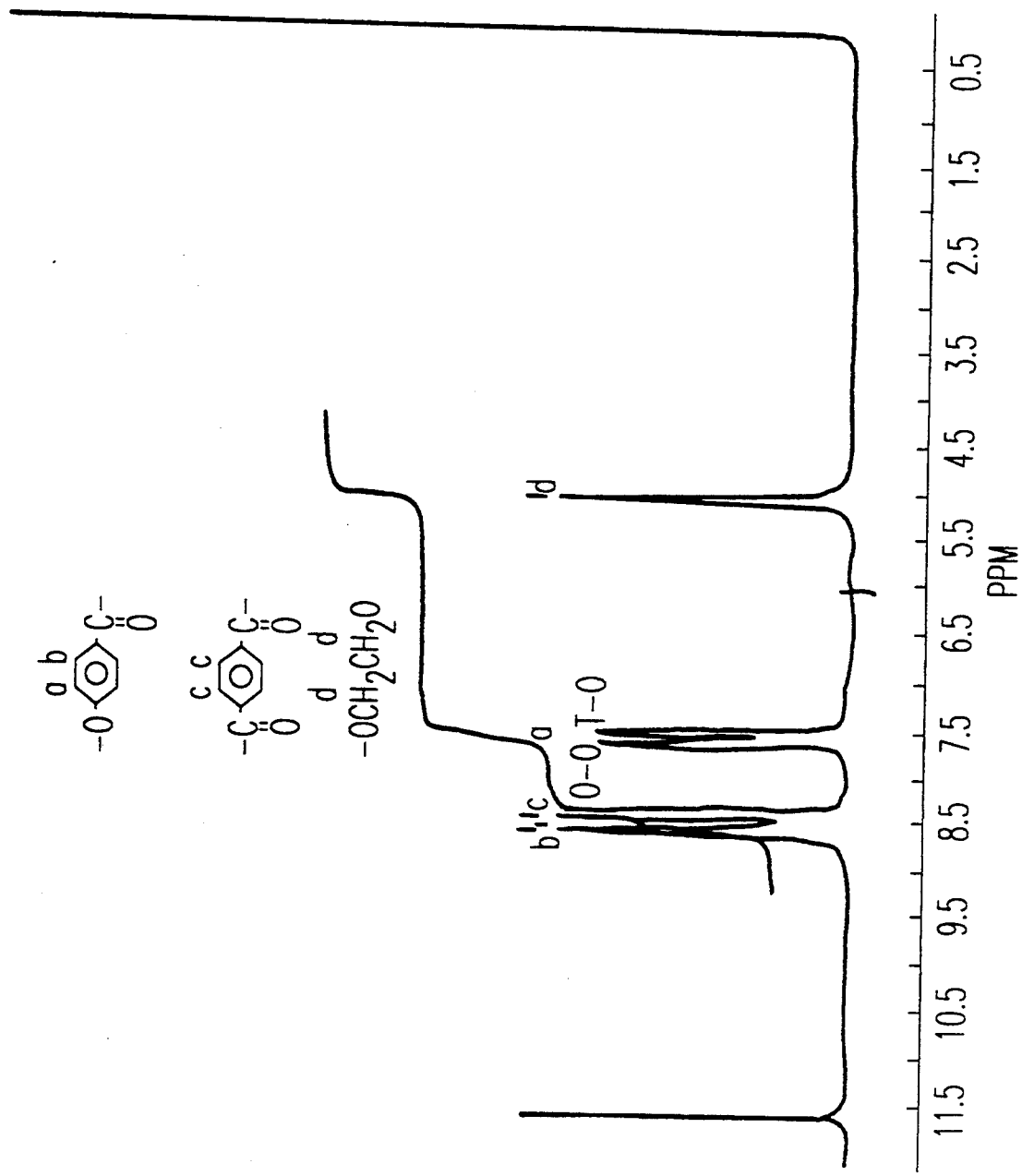
FIG. 3 is a $^1$H-NMR chart used to obtain $r_1$ in Example 2.
Figure 4:
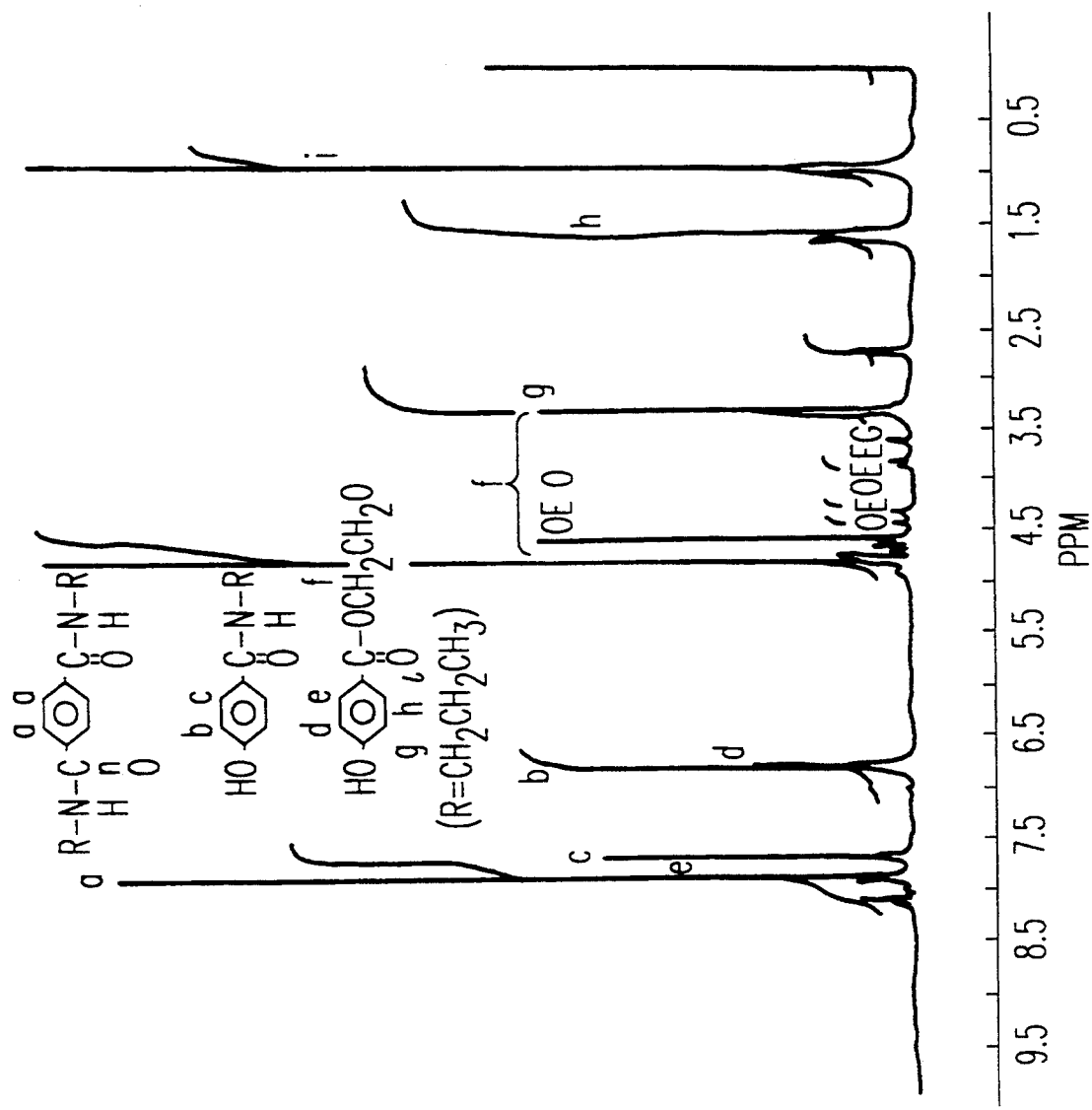
FIG. 4 is a $^1$H-NMR chart after amine decomposition used to obtain $r_2$ in Example 2.

With this polymer, $r_1=0.75$, and $r_2=0.78$. FIG. 1 shows a NMR chart used for obtaining $r_1=0.75$, and FIG. 2 shows a NMR chart after amine decomposition used for obtaining $r_2=0.78$. Further, various mechanical properties were as shown in Table 1.

Further, FIG. 5 shows various vibron charts including Example 1 of the present invention. The one shown in the Figure, is the chart of Example 1.

Vibron $T_1$ is very high at a level of 224° C. which is higher by about 20° C. than the conventional polymers having the same composition and the same compositional ratio (Comparative Examples 2, 4, 5 and 6), and $T_2$ was 270° C. and lower than the conventional polymers of the same composition and the same compositional ratio except for Comparative Example 4.

$T_2 - T_1$ of this polymer was 46° C. which is a width substantially small as compared with conventional polymers.

Among the mechanical properties, especially with respect to the elongation at breakage, the polymer of the present invention shows a value of 3.7% whereas the conventional polymers (Comparative Examples 2, 4, 5 and 6 given hereinafter) show values not higher than 3%. Namely, this indicates that the polymer of the present invention has substantial toughness, while those having values not higher than 3% are rather brittle. Further, as compared with the Comparative Examples, the melt viscosity is low relative to $\eta_{inh}$. Further, the product of the present invention shows better mechanical properties as the molding temperature is lower, while the conventional polymers (Comparative Examples 2 and 4) show better mechanical properties as the molding temperature is higher.

FIG. 7 shows a DSC chart of the polymer obtained in Example 1. The crystallinity is very high (the value $\Delta H$ is large) and $T_m=265.7°$ C., which very well corresponds to $T_2=270°$ C.

FIG. 8 shows the results of the X-ray scattering measurement. Namely, the positions of peaks of the scattering pattern in the meridional direction are as follows:

| Meridional direction | Positions of peaks |
| --- | --- |
| 15.2° | — |
| 23.5° | very weak |
| 28.05° | |
| 35.9° | very weak |
| 39.4° | very weak |
| 43.65° | |

The positions of peaks of the scattering pattern in the equatorial direction are as follows:

| Equatorial direction | Positions of peaks |
| --- | --- |
| 20.4° | |
| 35.8° | |

Also from these results, it is evident that the scattering intensity is high, and the crystallinity is high. The peak observed in the scattering pattern in the meridional direction, such as the peak at 15.2°, is at a wide angle side than the peak of the conventional polymer with the same compositional ratio. Likewise, the position of the peak observed in the scattering pattern in the equatorial direction is 20.4°, and thus the scattering angle is larger than the conventional polymer. Namely, this indicates that the size of the crystal lattice in the direction of the fiber axis (i.e. the fiber period) is smaller than the conventional polymers. Also with respect to the packing between molecules, the distance between molecules is shorter than the conventional polymers, and the packing of molecules is denser.

Using this sample, the Izod impact strength was measured and was found to be as high as 58 kg.cm/cm.

Further, the sample was molded by the 0.1 oz injection molding machine by means of mold B, and the molded product showed a tensile strength as high as 2,220 kg/cm².

EXAMPLES 2 TO 8

The operation was conducted in the same manner as in Example 1 except that the types and feeding ratios of the starting materials and the polymerization conditions were changed as shown in Table 1. The polymerization conditions, etc. in Examples 1 to 8 and the results of measurements of various physical properties are listed in Table 1.

EXAMPLE 9

Into a glass tube equipped with a stirrer, a nitrogen inlet and a vacuum port, 49.1 (0.163 mol) of

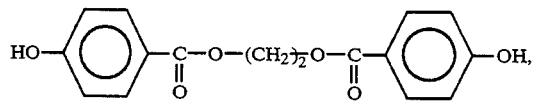

27.0 g (0.163 mol) of

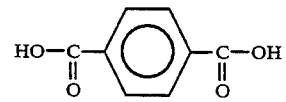

39.3 g (0.284 mol) of

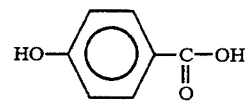

and 5.6 g (0.041 mol) of

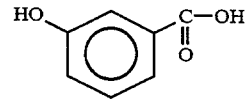

were charged, and the polymerizer was flushed with nitrogen under vacuum. Then, 83.0 g (0.813 mol) of acetic anhydride was added thereto. The system was heated to 140° C. under stirring and maintained at 140° C. for one hour. Then, it was heated to 275° C. over a period of 1.5 hours. When the temperature reached 275° C., vacuuming was started. The pressure was reduced to 10 mmHg in one hour and then from 10 mmHg to 0.3 mmHg over a period of 1.5 hours. Polymerization was conducted under 0.3 mmHg for 30 minutes, whereupon the torque was sufficiently high, and the polymerization was terminated.

Then, the system was left to stand still to let the pressure return to a normal level, and the polymer was discharged from the bottom of the glass tube. The dischargeability was excellent. The polymer was formed into chips and then dried under vacuum at 120° C. overnight. This polymer had $\eta_{inh}$ of 1.17 and a melt viscosity of 750 poise at 275° C.

With this polymer, $r_1=0.80$. FIG. 13 shows the NMR chart after amine decomposition which was used for obtaining $r_1=0.80$. Further, various mechanical properties were as shown in Table 2.

Further, FIG. 11 shows a chart of various vibrons including Example 9. The one shown in the Figure is that of Example 9. Vibron $T_1$ is 175° C., and $T_2$ was 250° C. Thus, $a=T_2-T_1=75°$ C., which is substantially small as compared with the conventional polymer having the same compositional ratio.

The mechanical properties were measured with respect to a specimen molded by the 0.1 oz injection molding machine by means of mold B. Among the mechanical properties, especially the tensile strength was as high as 2480 kg/cm$_2$. Also the elongation at breakage was 4.6% which is substantially high as compared with Comparative Examples with the same compositional ratio. Namely, this indicates that the polymer of the present invention is fairly tough, while those having an elongation at breakage of not higher than 3% tend to be brittle, as mentioned above.

Further, as compared with the Comparative Examples, the melt viscosity is low relative to $\eta_{inh}$.

The temperature dependency of the melt viscosity was small with 750 poise at 275° C. and 430 poise at 290° C.

EXAMPLES 10 TO 16

The operation was conducted in the same manner as in Example 9 except that the types and feeding ratios of the starting materials and the polymerization conditions were changed as shown in Table 2. Namely, after acetylation, the temperature was raised to the polymerization temperature over a period of 1.5 hours, and when the temperature reached the polymerization temperature, vacuuming was started.

The pressure was reduced to 10 mmHg in one hour and then to a level of less than 1 mmHg over a period of 1.5 hours.

Accordingly, in a case where the polymerization time was 2.5 hours or more, the final pressure was lower than 1 mmHg, and in a case where the polymerization time was less than 2.5 hours, the pressure at that time was the final pressure, which was 1 mmHg or higher.

The polymerization conditions in Examples 9 to 16 and the results of measurement of various physical properties are shown in Table 2.

Examples 13 and 14 will be described in further detail.

In Example 13, the polymerization was conducted by using the same glass tube as in Example 9 under the conditions as identified in Table 2.

FIG. 13 shows the NMR chart used for the determination of $r_3=0.78$. $\eta_{inh}=1.36$. The melt viscosity at 275° C. was 1580 poise, and the tensile strength of the molded specimen at 275° C. was as high as 2580 kg/cm$^2$. Also the elongation at breakage was as high as 4.4%, thus indicating toughness.

Example 14 was conducted in a scale 50 times the scale of Example 13 using a SUS 20 l autoclave. With this polymer, $r_3=0.78$, $\eta_{inh}=1.32$ and the melt viscosity at 275° C. was 1500 poise. Molding was conducted by varying the temperature, whereby the results as shown in Table 1 were obtained. These results indicate that the elastic modulus, strength and elongation are higher as the molding temperature is lower. Further, ASTM specimens were prepared, and the Izod impact strength and HDT were measured. Further, the vibron chart of this polymer is shown in FIG. 11. $T_1=180$ and $T_2=259°$ C. Thus, a was as small as 79° C.

Further, FIG. 12 shows a DSC chart. A distinct melting point was shown with $T_m=260.4°$ C.

70 Parts by weight of this polymer and 30 parts by weight of glass fiber were kneaded by a twin screw kneader. Then, ASTM specimens were prepared, and HDT was measured in the same manner as described above.

FIG. 14 shows a NMR chart after amine decomposition for determining $r_3$ in Example 12.

EXAMPLE 17

Into a glass tube equipped with a stirrer, a nitrogen inlet and a vacuum port, 29.3 g (0.161 mol) of

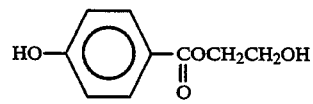

and 22.2 g (0.161 mol) of

were charged, and the glass tube was flushed with nitrogen under vacuum. Then, while supplying nitrogen, the system was heated under stirring. The system became transparent at 170° C., and when reached 180° C. it was maintained at that temperature for 2 hours. Then, it was heated to 200° C. and maintained for one hour. As the reaction proceeded, the system became opaque and was finally solidified.

Then, 44.4 g (0.322 mol) of

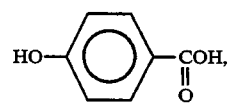

26.7 g (0.161 mol) of

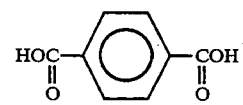

and 82.1 g (0.805 mol) of acetic anhydride were added thereto, and acylation was conducted for one hour at 140° C. under stirring. Then, the system was heated to 275° C. over a period of 1.5 hours, and then vacuuming was started. The pressure was reduced to 10 mmHg in one hour and then from 10 mmHg to 0.3 mmHg over a period of 1.5 hours. When polymerization was conducted under 0.3 mmHg for 2 hours, the torque became sufficiently high, and therefore, the polymerization was terminated.

Then, the system was left to standstill to let the pressure return to a normal level, and the polymer was discharged from the bottom of the polymerizer. The dischargeability was excellent.

The polymer was formed into chips and dried at 120° C. overnight.

This polymer had $\eta_{inh}$ of 1.00 dl/g, and the melt viscosity was 730 poise when $\dot{\gamma}=10^3 \text{ sec}^{-1}$ at 275° C.

Then dumbbell specimens were prepared by the 0.1 oz injection molding machine (mold: B), and the mechanical properties were measured. The elongation at breakage was 3.3%, and the tensile strength was 2000 kg/cm$^2$, and the modulus of elasticity was $9.0 \times 10^4$ kg/cm$^2$.

With this polymer, $r_1=0.82$, and $r_2=0.82$.

EXAMPLE 18

Into a glass tube equipped with a stirrer, a nitrogen inlet and a vacuum port, 29.3 g (0.161 mol) of

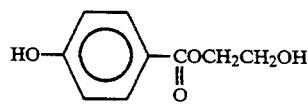

and 86.9 g (0.483 mol) of

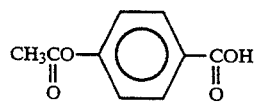

were charged, and the glass tube was flushed with nitrogen under vacuum. Then, while supplying nitrogen, the system was heated under stirring. The system became transparent at 200° C. and maintained for 2 hours for the reaction.

Then, 26.7 g (0.161 mol) of

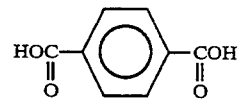

and 20.5 g (0.201 mol) of acetic anhydride were added thereto, and the mixture was maintained at 140° C. for one hour under stirring. Then, the temperature was raised to 275° C. over a period of 1.5 hours, and vacuuming was started. The pressure was reduced to 10 mmHg in one hour and then from 10 mmHg to 0.3 mmHg over a period of 1.5 hours. When polymerization was conducted under 0.3 mmHg for 3 hours, the torque became sufficiently high, and the polymerization was terminated.

Then, the system was left to stand still to let the pressure return to a normal level, and the polymer was discharged from the bottom of the glass tube.

The polymer was formed into chips and dried at 120° C. overnight. This polymer had $\eta_{inh}$ of 1.03 dl/g and a melt viscosity of 700 poise when $\dot{\gamma}=10^3 \text{ sec}^{-1}$ at 275° C.

Then, dumbbell specimens were prepared by the 0.1 oz injection molding machine (mold B), and the mechanical properties were measured, whereby the elongation at breakage was 3 4%, the tensile strength was 2020 kg/cm$^2$, and the modulus of elasticity was $9.5 \times 10^4$ kg/cm$^2$. With this polymer, $r_1=0.82$ and $r_2=0.82$.

TABLE 1

| Example No. | Starting materials (6), (7) | (8) | (9-1), (10-1) | (16) | Polymerization Temp. (°C.) | Time hr. | Time min. | Final pressure (mmHg) |
|---|---|---|---|---|---|---|---|---|
| 1 | CH₃—C(=O)—O—⌬—C(=O)—O—(CH₂)₂—O—C(=O)—⌬—OH  77.2 g (0.205 mol) | HO—C(=O)—⌬—C(=O)—OH  26.7 g (0.161 mol) | HO—⌬—C(=O)—OH  44.4 g (0.322 mol) | 82.1 g (0.81 mol) | 275 | 1 | 55 | 6 |
| 2 | HO—⌬—C(=O)—O—(CH₂)₂—O—C(=O)—⌬—OH  59.8 g (0.198 mol) | HO—C(=O)—⌬—C(=O)—OH  32.9 g (0.198 mol) | HO—⌬—C(=O)—OH  27.3 g (0.198 mol) | 75.2 g (0.74 mol) | 275 | 6 | 00 | 0.2 |
| 3 | HO—⌬—C(=O)—O—(CH₂)₂—O—C(=O)—⌬—OH  77.3 g (0.256 mol) | HO—C(=O)—⌬—C(=O)—OH  42.5 g (0.256 mol) | — | 65.3 g (0.64 mol) | 275 | 4 | 00 | 0.2 |
| 4 | HO—⌬—C(=O)—O—(CH₂)₂—O—C(=O)—⌬—OH  41.1 g (0.136 mol) | HO—C(=O)—⌬—C(=O)—OH  22.6 g (0.136 mol) | HO—⌬—C(=O)—OH  56.3 g (0.408 mol) | 86.7 g (0.85 mol) | 290 | 0 | 40 | 25 |
| 5 | CH₃—C(=O)—O—⌬—C(=O)—O—(CH₂)₂—O—C(=O)—⌬—OH  77.2 g (0.205 mol) | HO—C(=O)—naphthalene—C(=O)—OH  43.2 g (0.20 mol) | CH₃—C(=O)—O—⌬—C(=O)—OH  36.0 g (0.20 mol) | 5.1 g (0.05 mol) | 290 | 3 | 30 | 0.25 |
| 6 | HO—⌬—C(=O)—O—(CH₂)₂—O—C(=O)—⌬—OH  48.6 g (0.161 mol) | HO—C(=O)—⌬—C(=O)—OH  20.1 g (0.12 mol) and HO—C(=O)—⌬(C(=O)OH)—C(=O)—OH  6.4 g (0.04 mol) | HO—⌬—C(=O)—OH  44.4 g (0.32 mol) | 82.1 g (0.81 mol) | 275 | 1 | 15 | 20 |
| 7 | Same as Example 1 | Same as Example 1 | Same as Example 1 | Same as Example 1 | 275 | 4 | 00 | 0.15 |

TABLE 1-continued

| Example No. | | | Same as Example 1 | | | | | | Same as Example 1 | | | | | | Same as Example 1 | | |
|---|---|---|---|---|---|---|---|---|---|---|---|---|---|---|---|---|---|
| 8 | | | | | | | | | | | | | | | Same as Example 1 | 290 | 1 | 40 | 6 |

| | Discharge- | Melt viscosity (poise) Temperature | | | | | | Molding temp | 500 MHz - $^1$H-NMR of polymers | | | | | | Amine decomposition - $^1$H-NMR | | | | | Solubility in hexafluoro- |
|---|---|---|---|---|---|---|---|---|---|---|---|---|---|---|---|---|---|---|---|---|
| Example No. | ability | 200 (°C.) | 220 (°C.) | 260 (°C.) | 275 (°C.) | 290 (°C.) | | temp (°C.) | Ratios of polymer units (molar ratios) [1] [2] [3] | | | Ratios of chains of (3-1) and (3-2) $\frac{[3-1]}{[3]} \times 100$ $\frac{[3-2]}{[3]} \times 100$ $r_1$ | | | Ratios of polymer units (molar ratios) [1] [2] [3] | | | Ratios of chains of (3-4) $\frac{[3]-[3-4]}{[3]} \times 100$ $\frac{[3-4]}{[3]} \times 100$ $r_2$ | $\eta_{inh}$ (dl/g) | isopropanol |
| 1 | — | — | — | 5,600 | 830 | 520 | | 275 | 20 20 80 | | | 60 40 0.75 | | | 20 20 80 | | | 61 39 0.78 | 0.98 | ○ |
| 2 | ○ | — | — | — | — | — | | 290 | 25 25 75 | | | 53 47 0.75 | | | 25 25 75 | | | 52 48 0.72 | 0.91 | ○ |
| 3 | ○ | — | — | 580 | 310 | — | | 250 | 34 34 66 | | | 42 58 0.74 | | | 33 33 67 | | | 43 57 0.74 | 0.54 | ○ |
| 4 | ○ | — | — | — | — | — | | 275 | 16.5 16.5 83.5 | | | 66 34 0.77 | | | 17 17 83 | | | 65 35 0.76 | 0.75 | ○ |
| 5 | ○ | 1,450 | 230 | — | 1,000 | 110 | | 275 | 25 26 75 | | | 55 45 0.81 | | | 25 25 75 | | | 56 44 0.85 | 0.64 | ○ |
| 6 | ○ | — | — | — | — | — | | — | 20 20 80 | | | 62 38 0.82 | | | 20 20 80 | | | 62 38 0.82 | 1.07 | ○ |
| 7 | ○ | — | — | — | 560 | 210 | | 275 | 20 19 80 | | | 61 39 0.77 | | | 21 20 79 | | | 61 39 0.78 | 1.53 | ○ |
| 8 | ○ | — | — | — | 1,850 1,150 | 700 | | 290 290 | 20 20 80 | | | 61.5 38.9 0.80 | | | 20 20 80 | | | 61 39 0.78 | 1.31 | ○ |

| Example No. | Mechanical properties (Tensile properties) 0.1 oz (Mold A) | | | HDT (°C.) | Vibron data | | | Liquid crystallinity | Crystallinity | |
|---|---|---|---|---|---|---|---|---|---|---|
| | Elastic modulus ×10$^{-4}$(kg/cm$^2$) | Strength (kg/cm$^2$) | Elongation at breakage (%) | | $T_1$ (Temp. under 3 × 10$^{10}$ dyne/cm$^2$) (°C.) | $T_2$ (Temp. under 5 × 10$^9$ dyne/cm$^2$) (°C.) | $a = T_2 - T_1$ (°C.) | | DSC | X-ray |
| 1 | 7.0 | 1,320 | 3.7 | 197 | 224 | 270 | 46 | ○ | $T_m$ = 265.7° C. $T_c$ = 223.8° C. | Described above |
| 2 | 7.0 | 1,280 | 3.5 | 170 | 185 | 240 | 55 | ○ | — | — |
| 3 | 7.6 | 1,330 | 3.5 | 113 | 118 | 189 | 71 | ○ | — | — |
| 4 | 7.6 | 1,230 | 3.0 | 213 | 221 | 288 | 67 | ○ | — | — |
| 5 | — | — | — | 162 | 174 | 249 | 75 | ○ | — | — |
| 6 | 6.6 | 1,250 | 3.3 | 138 | 165 | 243 | 78 | ○ | — | — |
| 7 | 7.9 | 1,380 | 3.6 | — | — | — | — | | — | — |
| 8 | 6.4 | 1,370 | 4.7 | — | — | — | — | | — | — |
| | 7.7 | 1,230 | 3.4 | — | — | — | — | | — | — |

TABLE 2

| Example No. | Starting materials (6), (7) | (8) | (9-1), (10-1) | (9-2), (10-2) | (16) | Polymerization Temp. (°C.) | Time hr | Time min | Final pressure (mmHg) | Dischargeability |
|---|---|---|---|---|---|---|---|---|---|---|
| 9 | HO-⌬-C(=O)-O-(CH$_2$)$_2$-O-C(=O)-⌬-OH  49.1 g (0.163 mol) | HO-C(=O)-⌬-C(=O)-OH  27.0 g (0.163 mol) | HO-⌬-C(=O)-OH  39.3 g (0.284 mol) | HO-⌬(m)-C(=O)-OH  5.6 g (0.041 mol) | 83.0 g (0.813 mol) | 275 | 3 | 00 | 0.2 | ○ |
| 10 | 49.1 g (0.163 mol) | 27.0 g (0.163 mol) | 44.9 g (0.325 mol) | 4.5 g (0.033 mol) | 87.1 g (0.853 mol) | 275 | 2 | 15 | 3.5 | ○ |
| 11 | 49.1 g (0.163 mol) | 21.6 g (0.130 mol) | 53.8 g (0.39 mol) | 4.5 g (0.033 mol) | 87.1 g (0.853 mol) | 275 | 1 | 40 | 6 | ○ |
| 12 | 39.3 g (0.130 mol) | 27.0 g (0.163 mol) | 33.6 g (0.244 mol) | 11.2 g (0.081 mol) | 83.0 g (0.813 mol) | 275 | 4 | 00 | 0.19 | ○ |
| 13 | 49.1 g (0.163 mol) | 27.0 g (0.163 mol) | 42.6 g (0.309 mol) | 2.3 g (0.016 mol) | 83.0 g (0.813 mol) | 275 | 3 | 30 | 0.15 | ○ |
| 14 | 2434 g (8.06 mol) | 1338 g (8.06 mol) | 2113 g (15.3 mol) | 112 g (0.81 mol) | 4111 g (40.3 mol) | 275 | 4 | 20 | 0.5 | ○ |
| 15 | 43.0 g (0.143 mol) / HO-⌬(m)-C(=O)-O-(CH$_2$)$_2$-... 6.1 g (0.02 mol) | 27.0 g (0.163 mol) | 44.9 g (0.325 mol) | — | 83.0 g (0.813 mol) | 275 | 1 | 15 | 9 | ○ |

TABLE 2-continued

| Example No. | 16 | HO—⟨⟩—C(=O)—O—(CH₂)₂—O—C(=O)—⟨⟩—OH 49.1 g (0.136 mol) | HO—C(=O)—⟨⟩—C(=O)—OH 22.6 g (0.136 mol) | HO—⟨⟩—C(=O)—⟨⟩—C(=O)—OH 53.7 g (0.389 mol) | HO—⟨⟩—C(=O)—OH 2.63 g (0.019 mol) | Amine 86.6 g (0.85 mol) | | | | | |
|---|---|---|---|---|---|---|---|---|---|---|---| decomposition ¹H-NMR Ratios of polymer units (molar ratios)

| Example No. | [1] | [2] | [3] | [4] | [5] | $\frac{[4]}{[1]+[4]}$ | $\frac{[5]}{[3]+[5]}$ | $r_3$ | $\frac{[4]-[4-4]}{[4]}$ | $[4-4] \times 100$ | $\eta_{inh}$ (dl/g) | Melt viscosity (poise) 275°C | 290°C | Molding temp. (°C) |
|---|---|---|---|---|---|---|---|---|---|---|---|---|---|---|
| 9 | 20 | 20 | 75 | 5 | | 0.80 | 0.063 | 0.80 | 61.5 | 38.5 | 1.17 | 750 | 430 | 275 |
| 10 | 19.2 | 19.2 | 76.9 | 3.8 | | 0.81 | 0.047 | 0.78 | 62 | 38 | 1.12 | 560 | 310 | 275 |
| 11 | 16 | 16 | 80 | 4 | | 0.84 | 0.048 | 0.82 | 68 | 32 | 1.17 | | 430 | 280 |
| 12 | 20 | 20 | 70 | 10 | | 0.80 | 0.125 | 0.80 | 61.5 | 38.5 | 1.04 | | | 275 |
| 13 | 20 | 20 | 78 | 2 | | 0.80 | 0.025 | 0.78 | 61 | 39 | 1.33 | 1580 | 760 | 275 |
| 14 | 20 | 20 | 78 | 2 | | 0.80 | 0.025 | 0.78 | 61 | 39 | 1.32 | 1500 | 750 | 275 |
| | | | | | | | | | | | | | | 290 |
| | | | | | | | | | | | | | | 300 |
| Include 30 wt % glass fiber | | | | | | | | | | | | | | 275 |
| 15 | 20 | 20 | 75 | 5 | | 0.80 | 0.063 | 0.75 | 60 | 40 | 1.17 | 680 | 440 | 275 |
| 16 | 25 | 25 | 71.5 | 3.5 | | 0.75 | 0.047 | 0.80 | 54.5 | 45.5 | | | | 275 |

Mechanical properties (0.1 oz Mold B)

Tensile properties

| Example No. | Elastic modulus ×10⁻⁴ (kg/cm²) | Strength (kg/cm²) | Elongation at breakage (%) | Izod (kg·cm/cm) | Vicat Softening point (°C) | HDT (°C) | Melting point (°C) | Liquid crystallinity |
|---|---|---|---|---|---|---|---|---|
| 9 | 9.4 | 2,480 | 4.6 | — | 145 | — | — | ○ |
| 10 | 8.9 | 2,520 | 3.8 | — | 182 | — | — | ○ |
| 11 | 8.0 | 2,210 | 3.7 | — | 105 | — | — | ○ |
| 12 | 11.1 | >3,200 | 6.5 | — | 173 | — | — | ○ |
| 13 | 9.2 | 2,580 | 4.4 | — | — | — | — | ○ |
| 14 | 9.8 | 2,500 | 4.3 | 70 | 173 | — | 260.4 | ○ |
| | 9.6 | 2,410 | 4.0 | — | — | — | — | |
| | 7.0 | 2,360 | 3.7 | — | — | — | — | |
| Include 30 wt % glass fiber | | | | | | | | |
| 15 | 9.3 | 2,630 | 5.0 | — | — | 125 | — | ○ |
| 16 | 8.4 | 2,500 | 4.2 | — | — | 190 | — | ○○ |

Mechanical properties (0.1 oz Mold C)

Tensile properties

| Example No. | Elastic modulus ×10⁻⁴ (kg/cm²) | Strength (kg/cm²) | Elongation at breakage (%) |
|---|---|---|---|
| 9 | 9.4 | 2,180 | 4.3 |
| 10 | | | |
| 11 | | | |
| 12 | | | |
| 13 | 8.1 | 2,300 | 5.0 |
| 14 | 8.7 | 2,100 | 4.2 |
| Include 30 wt % glass fiber | | | |
| 15 | | | |
| 16 | | | |

FIG. 6 shows vibron charts of Examples 1 to 4. Each of them is a liquid crystalline polyester comprising

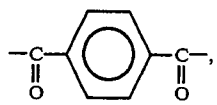

—OCH$_2$CH$_2$O— and

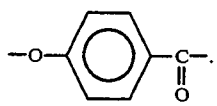

From the comparison of Examples 2 and 5, it is apparent that when R$^1$ is

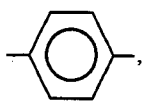

r$_1$ and r$_2$ tend to be small as compared with the case where R$^1$ is

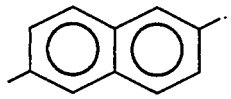

COMPARATIVE EXAMPLES 1 AND 2

Polymers were prepared in accordance with the method disclosed in Japanese Examined Patent Publication No. 18016/1981.

In Comparative Example 1, polymerization was conducted at a ratio of polyethylene terephthalate/p-acetoxybenzoic acid=30/70 (molar ratio).

In Comparative Example 2, polymerization was conducted at a ratio of polyethylene terephthalate/p-actoxybenzoic acid=20/80 (molar ratio).

The compositional ratios of the formed polymers

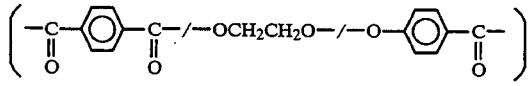

are shown in Table 3.

COMPARATIVE EXAMPLES 3 AND 4

Polymers were prepared in accordance with the method disclosed in Japanese Unexamined patent Publication No. 186527/1985.

The compositional ratios of the formed polymers of Examples 3 and 4

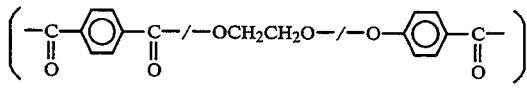

are shown in Table 3.

COMPARATIVE EXAMPLE 5

A two step polymerization was conducted in accordance with Japanese Unexamined Patent Publication No. 26632/1989, and the compositional ratios are shown in Table 3.

COMPARATIVE EXAMPLE 6

A polymer was prepared in accordance with Example 1 of Japanese Unexamined Patent Publication No. 45524/1990.

Various physical properties of Comparative Examples 1 to 6 are shown in Table 3. In each of Comparative Examples 1 to 6, R$^1$ of (1) is

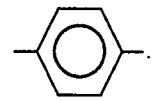

With respect to HDT, the operation was conducted in the same manner as in Example.

The polymers of Comparative Examples 1, 2, 5 and 6 could not be dissolved in hexafluoroisopropanol.

In Comparative Examples 2 and 4, the mechanical properties were improved when the polymers were molded at a high temperature.

In each of Comparative Examples 1 to 6, a (T$_2$ - T$_1$) exceeded 80° C.

In each case, the tensile strength and the elongation at breakage were low. Especially, the elongation at breakage was as low as not higher than 3%.

In Comparative Examples 2, 5 and 6, the melt viscosity (at 275° C.) was very high. Particularly in Comparative Examples 5 and 6, the melt viscosity was high relative to $\eta_{inh}$. In Comparative Example 2, $\eta_{inh}$ was not measured, since insoluble matters were present, but from the melt viscosity, it was apparent that the physical properties were inferior.

The scattering angles of the peaks in the X-ray data of Comparative Example 5 are shown in Table 3.

As compared with Example 1, the crystal lattice in the fiber direction is slightly large, and the packing distance between molecules is slightly large.

The data used for determining r$_1$ and r$_2$ in Comparative Example 2 are shown in FIGS. 9 and 10, respectively. From FIG. 9, it is evident that the proportion of (13) is high. From FIG. 10, it is evident that there is a substantial amount of independent HOCH$_2$CH$_2$OH i.e. there is a substantial amount of a unit of

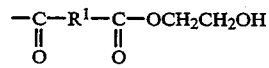

and/or

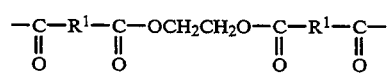

and there is a small amount of structure of

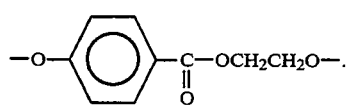

COMPARATIVE EXAMPLE 7

A polymer was prepared in accordance with the method disclosed in Japanese Examined Patent Publication No. 18016/1981. Namely, polyethylene terephthalate, p-actoxybenzoic acid and m-acetoxybenzoic acid were used as starting materials so that the final ratios of the polymer units would be the same as in Example 13 (see Table 4).

COMPARATIVE EXAMPLE 8

A polymer was prepared in accordance with the method disclosed in Japanese Unexamined Patent Publication No. 285916/1987. Namely, polyethylene terephthalate, acetic anhydride, p-hydroxybenzoic acid and m-hyroxybenzoic acid were used as starting materials so that the final ratios of polymer units would be the same as in Example 13 (see Table 4).

COMPARATIVE EXAMPLE 9

A polymer was prepared in accordance with the method disclosed in Japanese Unexamined Patent Publication No. 121095/1977. Namely, polyethylene terephthalate, p-hydroxybenzoic acid, m-hyroxybenzoic acid and diphenyl carbonate were used as starting materials so that the final ratios of polymer units would be the same as in Example 13 (see Table 4).

COMPARATIVE EXAMPLE 10

A polymer was prepared in accordance with the method disclosed in Japanese Unexamined Patent Publication No. 186525/1985, so that the final ratios of polymer units would be the same as in Example 13 (see Table 4).

COMPARATIVE EXAMPLE 11

Two step polymerization was conducted by an addition of m-acetoxybenzoic acid in accordance with the method disclosed in Japanese Unexamined Patent Publication No. 26632/1989. The ratios of polymer units are shown in Table 4.

TABLE 3

| Comparative Example No. | Ratios of polymer units (molar ratios) [1] | [2] | [3] | 500 MHz - ¹H-NMR of polymers Ratios of chains of (3-1) and (3-2) $\frac{[3-1]}{[3]} \times 100$ | $\frac{[3-2]}{[3]} \times 100$ | $r_1$ | Melt viscosity (poise) 275°C. | 290°C. | Molding temp (°C.) | Mechanical properties (Tensile properties) (0.01 oz mold A) Elastic modulus $\times 10^{-4}$ (kg/cm²) | Strength (kg/cm²) | Elongation at breakage (%) | HDT (°C.) | Amine decomposition - ¹H-NMR Ratios of chains of 3-4 Ratios of polymer units (molar ratios) [1] | [2] | [3] | $\frac{[3]-[3-4]}{[3]} \times 100$ | $\frac{[3-4]}{[3]} \times 100$ | $r_2$ | $\eta_{inh}$ (dl/g) | Vibron data $T_1$ (Temp. under $3 \times 10^{10}$ dyne/cm²) (°C.) | $T_2$ (Temp. under $5 \times 10^9$ dyne/cm²) (°C.) | $a = T_2 - T_1$ (°C.) | X-ray | Solubility in hexafluoro-isopropanol |
|---|---|---|---|---|---|---|---|---|---|---|---|---|---|---|---|---|---|---|---|---|---|---|---|---|---|
| 1 | 30 | 30 | 70 | 59 | 41 | 1.24 | — | — | 275 | 5.4 | 1020 | 3.0 | — | 30 | 30 | 70 | 61 | 39 | 1.34 | — | 125 | 223 | 98 | — | Insoluble |
| 2 | 20 | 20 | 80 | 69 | 31 | 1.11 | 1,800 | — | 275 | 3.5 | 570 | 2.3 | — | 20 | 20 | 80 | 70 | 30 | 1.18 | Insoluble | 101 | 288 | 187 | Orientation too low to be distinct | Insoluble |
| 3 | 25 | 24 | 75 | 59 | 41 | 0.96 | — | — | 300 | 4.5 | 870 | 2.6 | — | 25 | 24 | 75 | 61 | 39 | 1.00 | 0.91 | | | | | — |
| 4 | 21 | 20 | 80 | 63.5 | 36.5 | 0.91 | — | — | 275 | 6.7 | 1210 | 3.0 | 90 | 21 | 20 | 80 | 65.5 | 34.5 | 0.95 | 0.95 | 128 | 221 | 93 | — | Insoluble |
| 5 | 20 | 20 | 80 | 65 | 35 | 0.93 | 1,450 | — | 275 | 7.2 | 1220 | 2.8 | 120 | 20 | 20 | 80 | 67 | 33 | 1.02 | 0.98 | 138 | 236 | 98 | — | Insoluble |
| | | | | | | | | | 300 | 7.2 | 1250 | 3.0 | | | | | | | | | | | | | |
| | 20 | 20 | 80 | 65 | 35 | 0.93 | | | 275 | 6.9 | 1230 | 2.9 | 171 | 20 | 20 | 80 | 66 | 34 | 0.97 | 1.05 | 202 | 285 | 83 | Meridional direction: 14.82°, 27.92°, 43.4°, Equatorial 20.16°; | |
| 6 | | | | | | | 1,620 | — | 275 | 6.7 | 1180 | 2.7 | 152 | | | | | | | | 183 | 279 | 96 | — | |

TABLE 4

| Comparative Example No. | Amine decomposition $^1$H-NMR Ratios of polymer units [1] | [2] | [3] | [5] | $\frac{[4]}{[1]+[4]}$ | $\frac{[5]}{[3]+[5]}$ | $\frac{[4]-[4-4]}{[4]} \times 100$ | $r_3$ | $\eta_{inh}$ (dl/g) | Melt viscosity poise 275° C. | 290° C. |
|---|---|---|---|---|---|---|---|---|---|---|---|
| 7 | 20 | 20 | 78 | 2 | 0.80 | 0.025 | 72 | 1.29 | Insoluble | 1800 | 470 |
| 8 | 20 | 20 | 78 | 2 | 0.80 | 0.025 | 71 | 1.22 | Insoluble | 1600 | 520 |
| 9 | 20 | 20 | 78 | 2 | 0.80 | 0.025 | 70 | 1.18 | Insoluble | 1400 | 560 |
| 10 | 20 | 20 | 78 | 2 | 0.80 | 0.025 | 66 | 0.97 | 1.32 | — | — |
| 11 | 20 | 20 | 78 | 2 | 0.80 | 0.025 | 67 | 1.02 | — | 1700 | 600 |

| Comparative Example No. | Tensile properties (0.1 oz Mold B) | | | | | Tensile properties (0.3 oz Mold C) | | |
|---|---|---|---|---|---|---|---|---|
| | Elastic modulus $\times 10^{-4}$ (kg/cm$^2$) | Strength (kg/cm$^2$) | Elongation at breakage (%) | a (°C.) $T_2 - T_1$ | HDT (°C.) | Elastic modulus $\times 10^{-4}$ (kg/cm$^2$) | Strength (kg/cm$^2$) | Elongation at breakage (%) |
| 7 | 6.8 | 1560 | 2.7 | 105 | | | | |
| 8 | 7.4 | 1720 | 2.8 | 100 | | | | |
| 9 | 7.6 | 1780 | 2.8 | 102 | | | | |
| 10 | 7.9 | 1980 | 3.2 | 94 | 90 | 7.3 | 1,730 | 3.0 |
| 11 | 7.8 | 1910 | 3.1 | 97 | | | | |

EXAMPLE 19

Polymerization was conducted in the same manner as in Example 1 (three times in scale). After a polymerization time of 2 hours and 40 minutes (from the initiation of vacuuming), the polymerization was terminated, and the polymer was discharged. The dischargeability was excellent. $\eta_{inh}=1.32$.

This polymer was molded by the 0.1 oz injection molding machine by means of mold A or B and by the 0.3 oz injection molding machine by means of mold C. The respective values are shown in Table 5.

Further, the same polymer as in Example 1 was prepared and molded by the 0.1 oz injection molding machine by means of mold B and by the 0.3 oz injection molding machine by means of mold C.

Further, polymers of Comparative Examples 1 to 6 were also molded by the 0.1 oz injection molding machine by means of mold B and by the 0.3 oz injection molding machine by means of mold C.

EXAMPLE 20

Using a 20 l autoclave, polymerization was conducted in a scale 50 times the scale of Example 1. The results are shown in Table 5.

EXAMPLE 21

Polymerization was conducted with the same composition as in Example 6 for a polymerization time of 2 hours and 30 minutes. $\eta_{inh}$ was 1.25, $r_1=0.78$ and $r_2=0.80$.

This polymer was molded by the 0.1 oz injection molding machine (mold A), whereby the tensile strength was 1610 kg/cm$^2$ and the elongation at breakage was 5.0%.

EXAMPLE 22

Into a glass tube equipped with a stirrer, a nitrogen inlet and a vacuum port, 29.3 g (0.161 mol) of

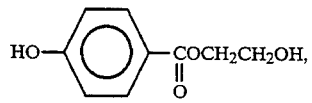

86.9 g (0.483 mol) of

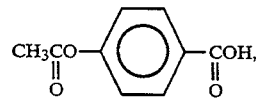

and 26.7 g (0.161 mol) of

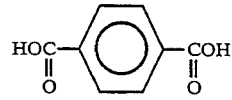

were charged, and the glass tube was flushed with nitrogen under vacuum. Then, while supplying nitrogen, the system was heated under stirring. The system became transparent at 200° C. and maintained for 2 hours for the reaction.

Then, 20.5 g (0.201 mol) of acetic anhydride were added thereto.

Further operation was conducted in the same manner as in Example 18 except that the total polymerizing time was 3 hours. The dischargeability of polymer was excellent. This polymer had $\eta_{inh}$ of 1.13 dl/g. Then dumbbell specimens were prepared by the 0.1 oz injection molding machine (mold: B), and the mechanical properties were measured The tensile strength was 2040 kg/cm$^2$, and the modulus of elasticity was $9.5 \times 10^4$ kg/cm$^2$.

TABLE 5

| | $\eta_{inh}$ (dl/g) | Melt viscosity poise 275° C. | Melt viscosity poise 290° C. | Molding temp (°C.) | Tensile properties (0.1 oz Mold A) | | | Tensile properties (0.1 oz Mold B) | | | Tensile properties (0.1 oz Mold C) | | | HDT (°C.) | Izod (kg·cm/cm) |
|---|---|---|---|---|---|---|---|---|---|---|---|---|---|---|---|
| | | | | | Elastic modulus ×10⁻⁴ (kg/cm²) | Strength (kg/cm²) | Elongation at breakage (%) | Elastic modulus ×10⁻⁴ (kg/cm²) | Strength (kg/cm²) | Elongation at breakage (%) | Elastic modulus ×10⁻⁴ (kg/cm²) | Strength (kg/cm²) | Elongation at breakage (%) | | |
| Example No. | | | | | | | | | | | | | | | |
| 19 | 1.32 | 1,100 | | 275 | 6.8 | 1,340 | 3.9 | 9.3 | 2,140 | 3.7 | 8.0 | 2.120 | 4.2 | | |
| 20 | 0.98* | 830* | 520* | 275* | 7.0* | 1,320* | 3.7* | 9.2 | 2,220 | 3.5 | 8.2 | 2,040 | 4.0 | 197* | 58 |
| Comparative Example No. | | | | | | | | | | | | | | | |
| 1 | — | —* | | 275* | 5.4* | 1,020* | 3.0* | | | | | | | 73 | |
| 2 | Insoluble* | 1,800* | | 275* | 3.5* | 570* | 2.3* | | | | | | | 152 | 18 |
| 3 | 0.91* | — | | 275* | 6.7* | 1,210* | 3.0* | | | | | | | 90* | |
| 4 | 0.95* | — | | 275* | 7.2* | 1,220* | 2.8* | 9.1 | 1,830 | 2.8 | 7.0 | 1,520 | 3.0 | 120* | 33 |
| 5 | 0.98* | 1,450* | | 275* | 6.9* | 1,230* | 2.9* | 7.7 | 1,730 | 2.9 | 5.7 | 1,460 | 3.0 | 171* | 30 |
| 6 | 1.05* | 1,620* | | 275* | 6.7* | 1,180* | 2.7* | | | | 6.4 | 1,350 | 2.8 | 152* | 27 |

*Data disclosed in Tables or in the description.

The absolute values for the mechanical properties (particularly strength) substantially vary depending upon the type of the molding machine or the type of the mold. However, the relative comparison among various polymers can adequately be made, and there is no doubt that the products of the present invention exhibit superior physical properties as compared with the products of Comparative Examples.

As described in the foregoing, the liquid crystalline polyester of the present invention is superior in the mechanical properties and thermal properties to conventional polyesters having the same composition and the same compositional ratio, as the sequence is alternately better controlled. Namely, it has high strength and high elongation and exhibits better physical properties as the molding temperature is lower. Further, since the crystallinity is high, the melting point is distinct, and reinforcing effects with e.g. glass fibers will be obtained. Further, HDT is high and yet it is flowable at a low temperature in spite of its heat resistance. Therefore, it has a merit that the polymerization temperature can be lowered. Further, it has a merit that even when the polymerization temperature is low, it can be readily withdrawn from the bottom of the glass tube.

Further, the liquid crystalline polyester of the present invention shows an optical anisotropy in its molten phase. Especially, once it starts to melt, there will be no substantial solid portion simply by raising the temperature slightly over the melt initiation temperature, and almost all will be a primary liquid crystal state. Thus, it has a feature that fluidity is far better than that of the conventional polyesters.

By virtue of the high fluidity, the liquid crystalline polyester of the present invention is suitable for e.g. precision molded products. For example, it is useful for automobile parts, parts of information materials such as compact discs or flexible discs or pats of electronic materials such as connectors or IC sockets.

It is also useful in the form of films or fibers, and is particularly suitable for films.

We claim:

1. A method for producing a liquid crystalline polyester, which comprises reacting compounds of the following formulas (6) and/or (7):

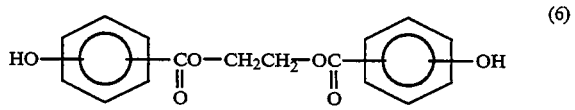

(6)

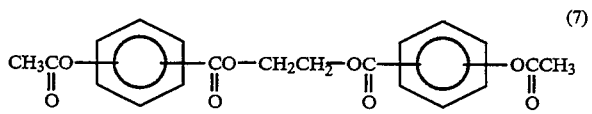

(7)

and a dicarboxylic acid of the following formula (8):

(8)

wherein R¹ is a bivalent aromatic hydrocarbon group having from 6 to 18 carbon atoms, and, if necessary, acetic anhydride, as starting materials, for polycondensation in a molten state.

2. The method according to claim 1, wherein the compounds of the formulas (6) and (7) are represented by the formulas (6-1) and (7-1), respectively:

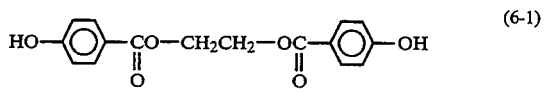

(6-1)

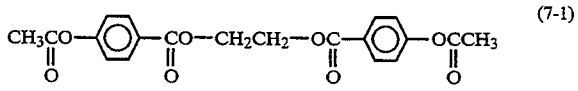

(7-1)

3. The method according to claim 1, wherein the compound of the formula (6) is represented by the formula (6-1) and the formula (6-2):

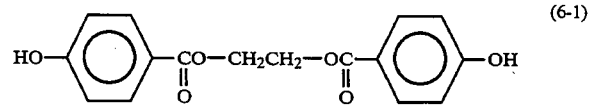

(6-1)

-continued

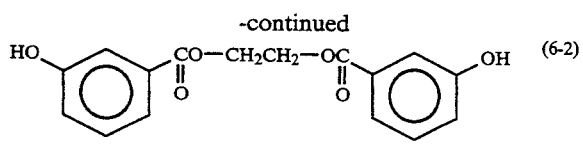 (6-2)

and the compound of the formula (7) is represented by the formula (7-1) and the formula (7-2):

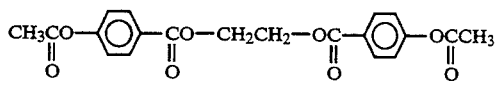 (7-1)

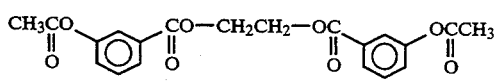 (7-2)

4. The method according to claim 1, wherein compounds of the following formulas (9) and/or (10):

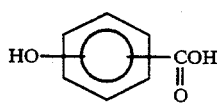 (9)

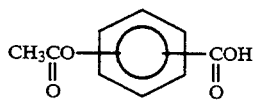 (10)

are further added as starting materials.

5. The method according to claim 4, wherein the compounds of the formulas (9) and (10) are represented by the formulas (9-1) and (10-1), respectively:

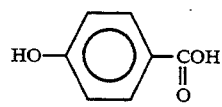 (9-1)

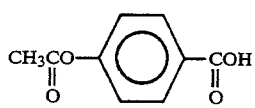 (10-1)

6. The method according to claim 4, wherein the compound of the formula (9) is represented by the formula (9-1) and/or the formula (9-2):

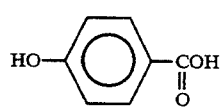 (9-1)

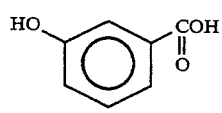 (9-2)

and the compound of the formula (10) is represented by the formula (10-1) and/or the formula (10-2):

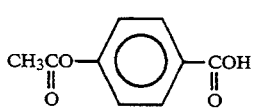 (10-1)

-continued

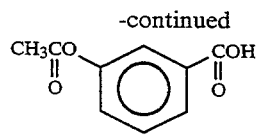 (10-2)

and where the moles of the compounds of the formulas (9-1), 9-2), (10-1) and (10-2) are represented by [9-1], [9-2], [10-1] and [10-2], respectively, they satisfy the following formula (VII):

$$\frac{[9-2] + [10-2]}{[9-1] + [10-1]} \leq 0.35 \quad (VII)$$

7. A method for producing a liquid crystalline polyester, which comprises reacting a compound of the following formula (11):

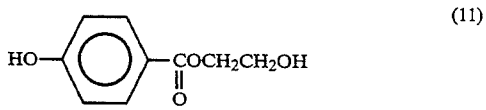 (11)

a dicarboxylic acid of the following formula (8):

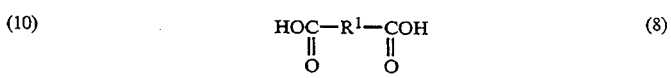 (8)

wherein $R^1$ is a bivalent aromatic hydrocarbon group having from 6 to 18 carbon atoms, at least one of compounds of the following formulas (9) and (10):

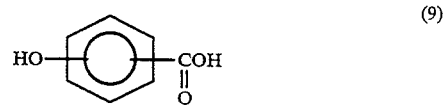 (9)

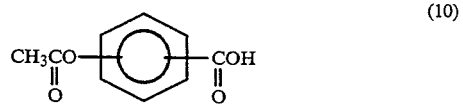 (10)

and acetic anhydride, as starting materials, for polycondensation in a molten state.

8. The method according to claim 7, wherein the compounds of the formulas (9) and (10) are represented by the formulas (9-1) and (10-1), respectively:

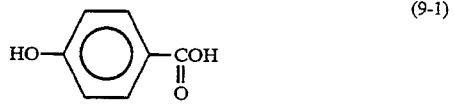 (9-1)

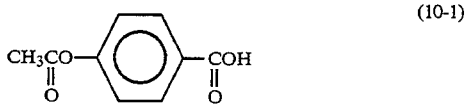 (10-1)

9. The method according to claim 7, wherein where the mols of the compounds of the formulas (9-1), (9-2), (10-1) and (10-2) are represented by [9-1], [9-2], [10-1] and [10-2], respectively, they satisfy the following formula (VII-1):

$$\frac{[9-2] + [10-2]}{[9-1] + [10-1]} \leq 0.25 \quad (VII-1)$$

* * * * *

UNITED STATES PATENT AND TRADEMARK OFFICE
CERTIFICATE OF CORRECTION

PATENT NO. : 5,340,911
DATED : August 23, 1994
INVENTOR(S) : Osamu KISHIRO, et al.

It is certified that error appears in the above-indentified patent and that said Letters Patent is hereby corrected as shown below:

On the title page, Item [30], the Foreign Application Priority Data has been omitted. It should read as follows:

--Apr. 6, 1990 [JP] Japan...2-91640--

Signed and Sealed this

Twenty-ninth Day of November, 1994

Attest:

BRUCE LEHMAN

*Attesting Officer*      *Commissioner of Patents and Trademarks*